United States Patent
Stenger et al.

(10) Patent No.: US 10,395,147 B2
(45) Date of Patent: Aug. 27, 2019

(54) METHOD AND APPARATUS FOR IMPROVED SEGMENTATION AND RECOGNITION OF IMAGES

(71) Applicant: Rakuten, Inc., Tokyo (JP)

(72) Inventors: Bjorn Stenger, Tokyo (JP); Jiu Xu, Tokyo (JP)

(73) Assignee: RAKUTEN, INC., Tokyo (JP)

(*) Notice: Subject to any disclaimer, the term of this patent is extended or adjusted under 35 U.S.C. 154(b) by 107 days.

(21) Appl. No.: 15/798,343

(22) Filed: Oct. 30, 2017

(65) Prior Publication Data

US 2019/0130233 A1    May 2, 2019

(51) Int. Cl.
    *G06K 9/00*      (2006.01)
    *G06K 9/72*      (2006.01)
    *G06T 7/143*      (2017.01)
    *G06K 9/62*      (2006.01)

(52) U.S. Cl.
    CPC .......... *G06K 9/726* (2013.01); *G06K 9/00476* (2013.01); *G06K 9/6212* (2013.01); *G06T 7/143* (2017.01); *G06K 2209/01* (2013.01); *G06T 2207/20084* (2013.01)

(58) Field of Classification Search
    CPC ................................................ G06K 9/00476
    See application file for complete search history.

(56) References Cited

U.S. PATENT DOCUMENTS

| | | | | |
|---|---|---|---|---|
| 5,988,862 A * | 11/1999 | Kacyra | ................ | G01B 11/002 |
| | | | | 382/195 |
| 2010/0020093 A1* | 1/2010 | Stroila | ................... | G01C 21/20 |
| | | | | 345/589 |
| 2010/0021012 A1* | 1/2010 | Seegers | ................... | G01C 21/20 |
| | | | | 382/113 |
| 2010/0023250 A1* | 1/2010 | Mays | ................... | G09B 29/106 |
| | | | | 701/533 |
| 2010/0275018 A1* | 10/2010 | Pedersen | ................. | G06T 19/00 |
| | | | | 713/168 |
| 2013/0346020 A1* | 12/2013 | Pershing | ................ | G06Q 10/06 |
| | | | | 702/156 |
| 2016/0364617 A1* | 12/2016 | Silberschatz | ...... | G06K 9/00771 |
| 2017/0083796 A1* | 3/2017 | Kim | ................... | G06K 9/00369 |

(Continued)

OTHER PUBLICATIONS

"Fully Convolutional Networks for Semantic Segmentation"; Jonathan Long, Evan Shelhamer, Trevor Darrell; May 20, 2016; arXiv.org>cs>arXiv:1605.06211; https://arxiv.org/abs/1605.06211.

(Continued)

*Primary Examiner* — Gandhi Thirugnanam
(74) *Attorney, Agent, or Firm* — HEA Law PLLC

(57) ABSTRACT

A system for and method for improved computer vision image processing and image segmentation and recognition is disclosed. The system and method utilizes a cost function approach for improved image segmentation and recognition. In particular, a global cost function is defined and then the global cost function is minimized. This global cost function takes into account two processing pipelines of data determined by the operation of two different processing technologies upon the target input image. Constraints are utilized to ensure data consistency across the model and between the data pipelines. The system and method are useful for processing low quality images containing alphanumeric data such as floorplan images.

20 Claims, 24 Drawing Sheets

(56) References Cited

U.S. PATENT DOCUMENTS

| | | | |
|---|---|---|---|
| 2017/0112401 A1* | 4/2017 | Rapin | A61B 5/04012 |
| 2017/0124432 A1* | 5/2017 | Chen | G06N 3/0454 |
| 2017/0124711 A1* | 5/2017 | Chandraker | G06K 9/00201 |
| 2017/0140236 A1* | 5/2017 | Price | G06K 9/4628 |
| 2017/0147905 A1* | 5/2017 | Huang | G06K 9/6232 |
| 2018/0025257 A1 | 1/2018 | van den Oord | |
| 2018/0268220 A1 | 9/2018 | Lee | |
| 2018/0300855 A1 | 10/2018 | Tang | |
| 2019/0130233 A1* | 5/2019 | Stenger | G06K 9/726 |
| 2019/0130573 A1* | 5/2019 | Xu | G06T 7/11 |

OTHER PUBLICATIONS

CS231n Convolutional Neural Networks for Visual Recognition; Andrej Karpathy; http://cs231n.github.io/convolutional-networks/; Mar. 16, 2016.

* cited by examiner

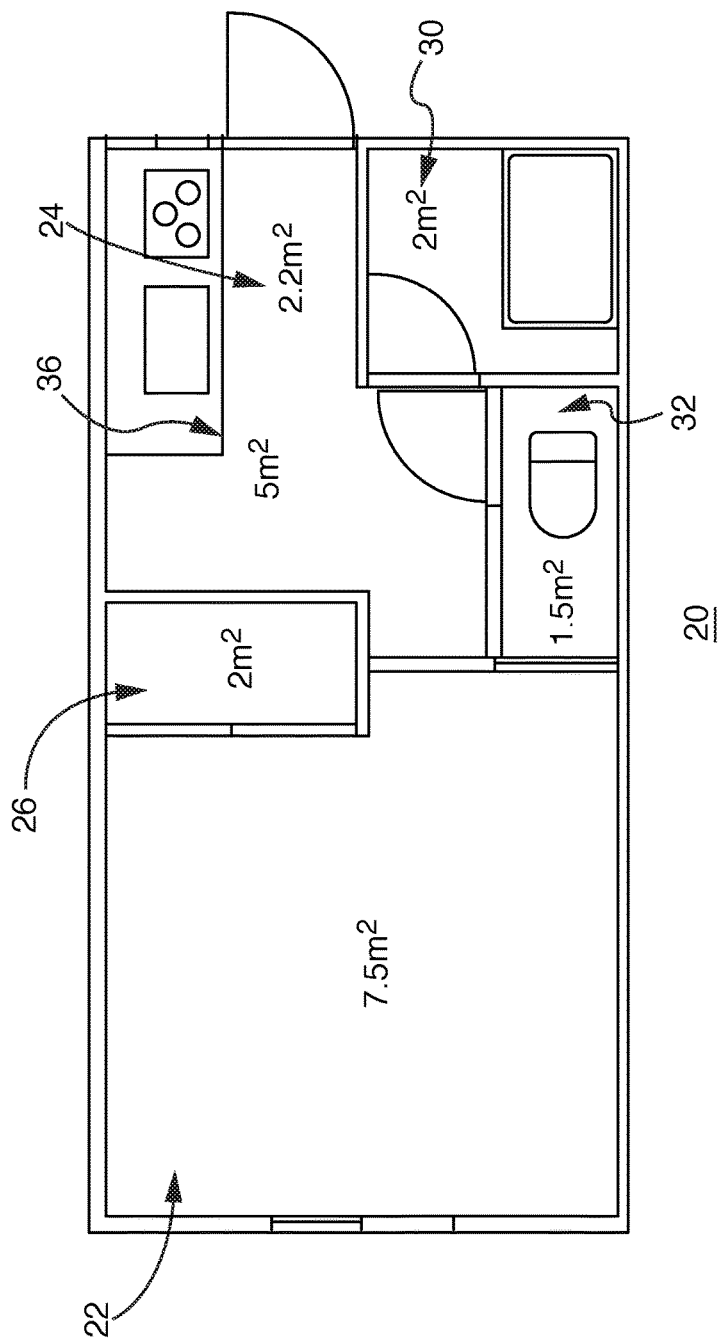

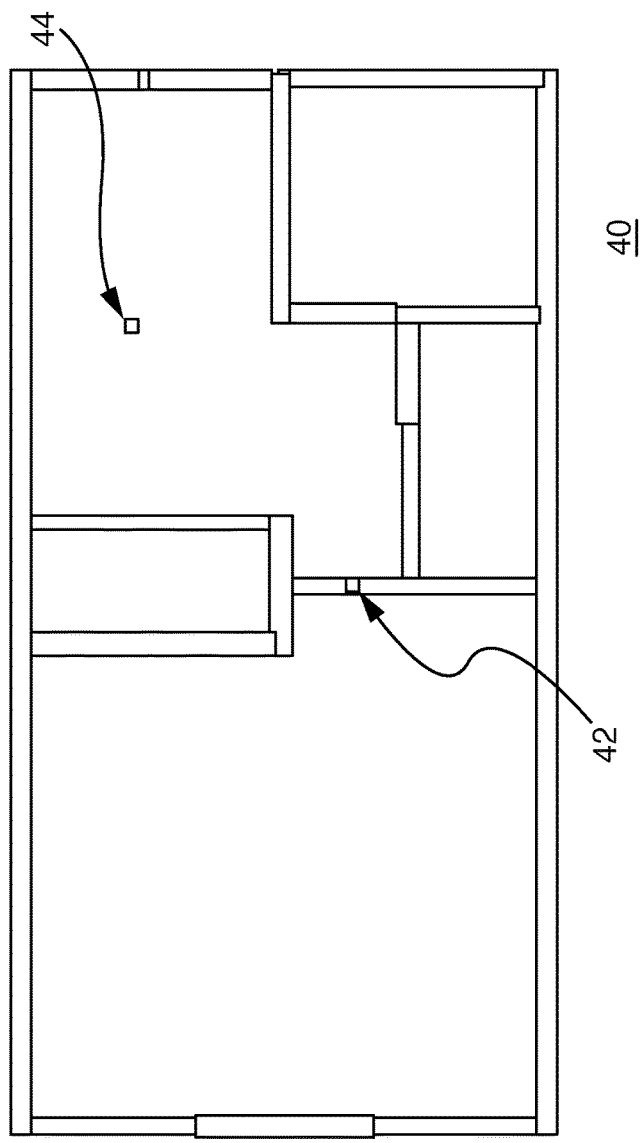

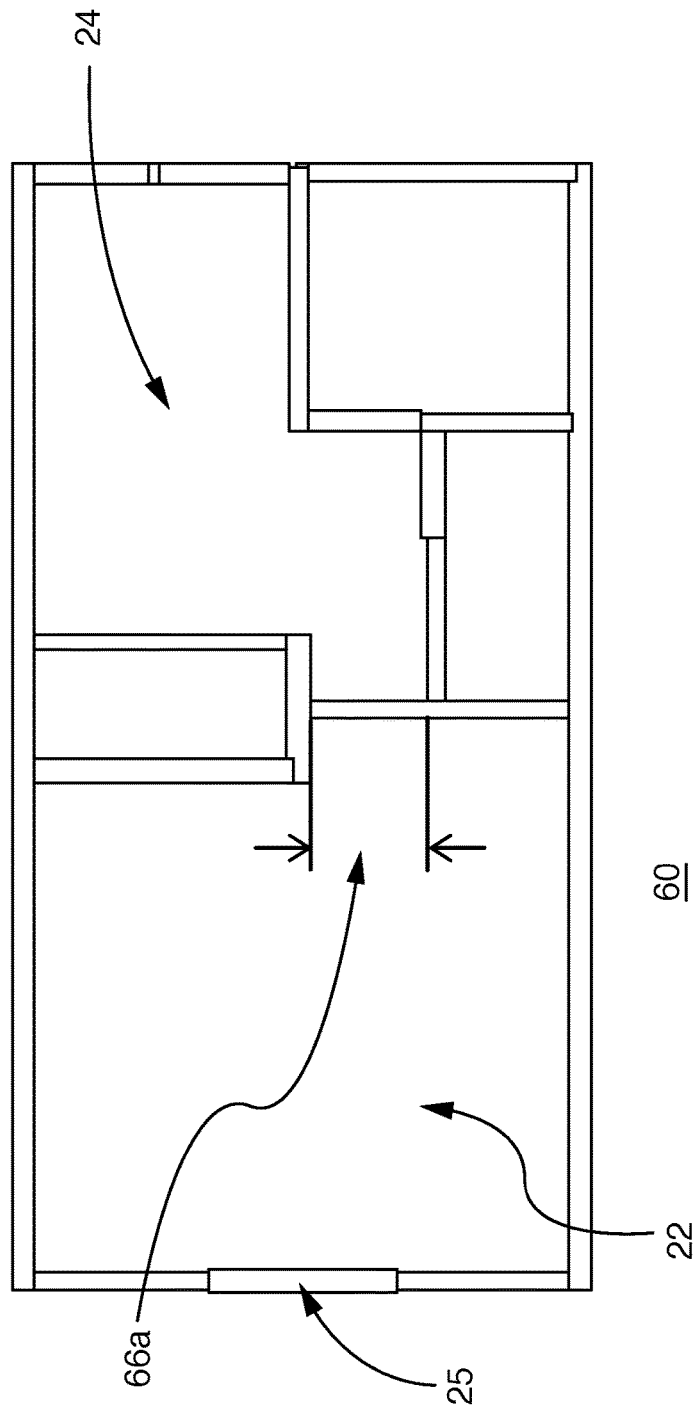

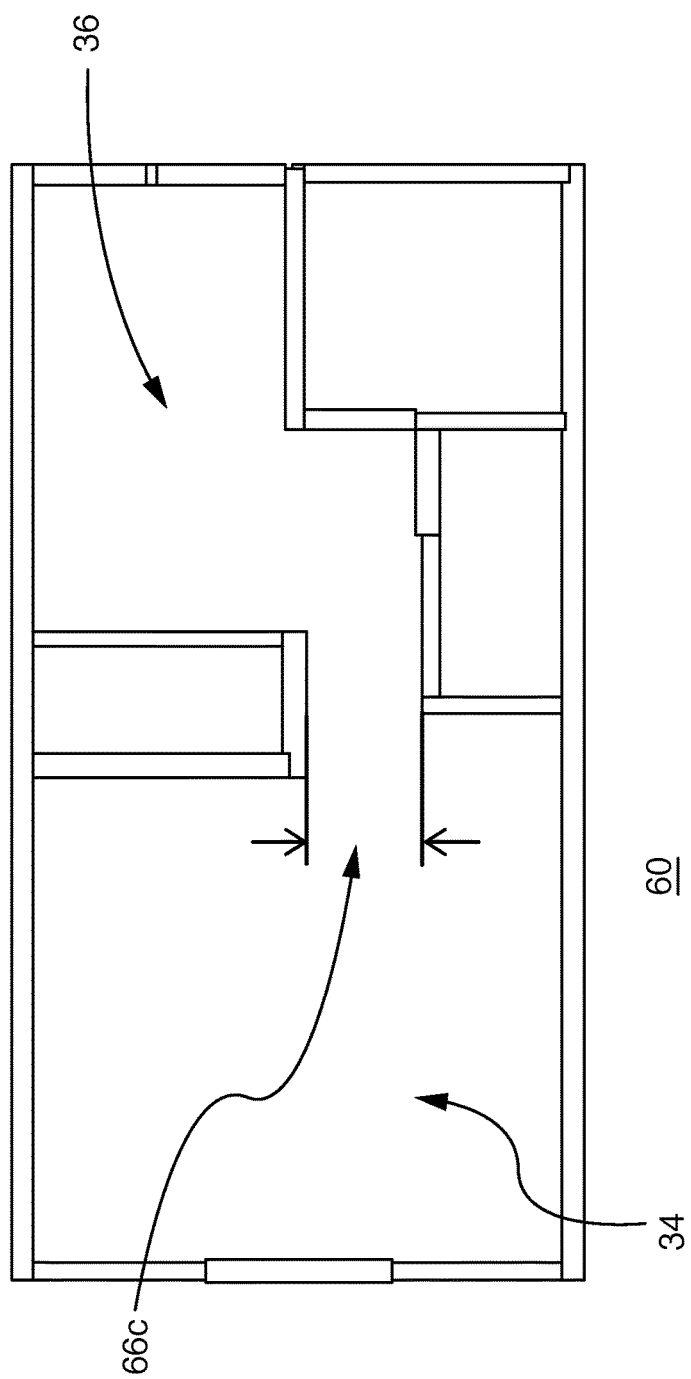

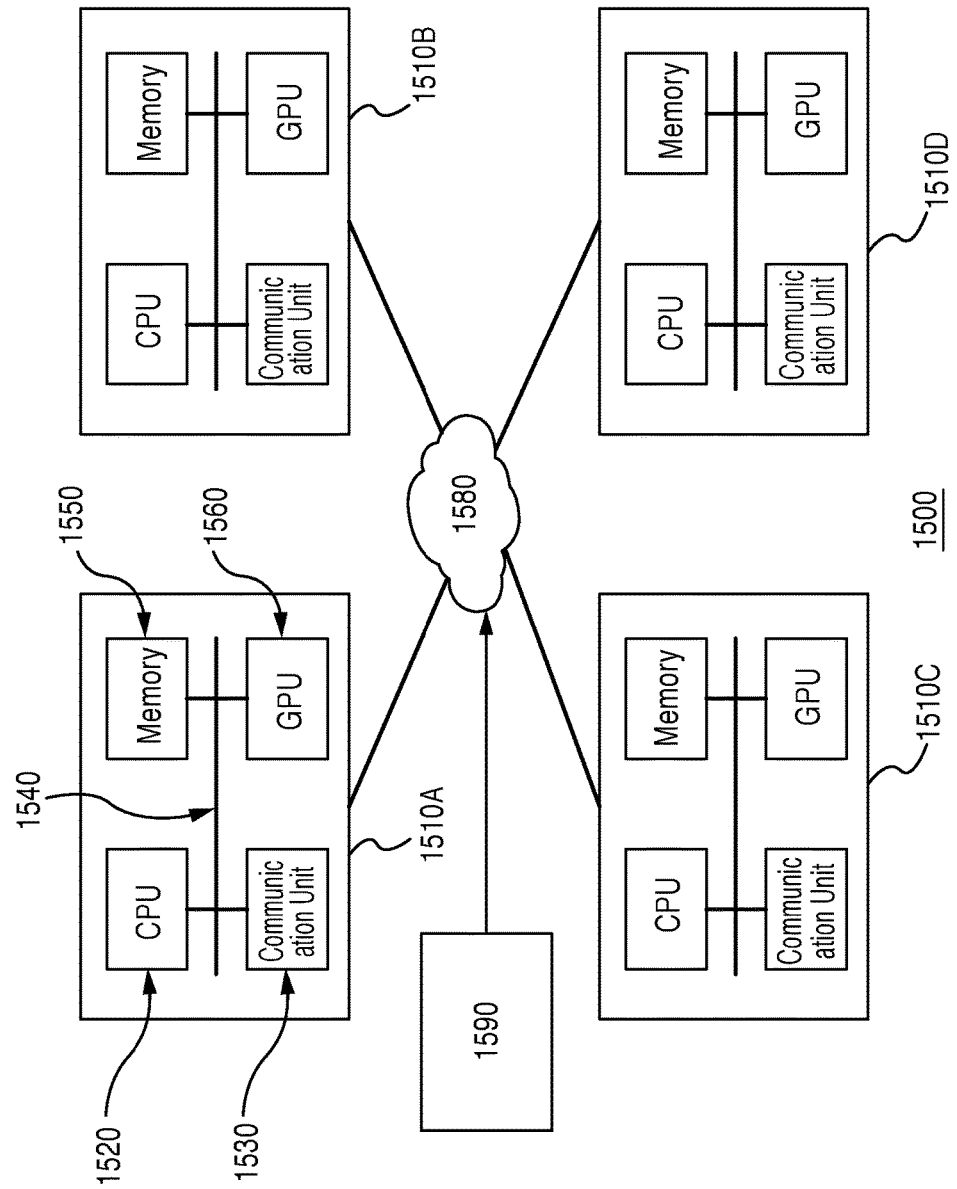

METHOD AND APPARATUS FOR IMPROVED SEGMENTATION AND RECOGNITION OF IMAGES

BACKGROUND

Image recognition and computer vision has been around since at least the 1960's when universities began pioneering artificial intelligence. Early on, when attempting image recognition, challenges such as viewpoint variation, scale, orientation, deformation, occlusion, illumination condition, background clutter, intra-class variation, object detection, and the like, emerged. Although improvements and advances have been made in these image recognition challenges over the last 50 years, current methodologies still have difficulty efficiently and accurately identifying objects contained in images.

FIG. 1 is an example of an image which is very difficult recognize using computer vision. FIG. 1 shows a typical floorplan image 2. As can be seen from the image, a variety of room spaces of varying dimensions are represented. Both pivoting doorways and sliding closet doors are depicted. Typical symbols representing appliances and fixtures are present. As can happen, area dimensions are given in divergent measurement terms: areas 10 are described in conventional Japanese measurements units of "j" or Jo, while area 12 is described in measurement units of "$m^2$" or meters squared.

Floorplan image 2 shows interior and exterior walls 8 and doors 6. Further, floorplan image 2 also shows bedrooms 10, balcony 12 and living room 14. As can be appreciated, image recognition and computer vision processing require great amounts of computer processing resources.

SUMMARY

In view of the above computer vision problems, the inventors have created a new machine and method for efficiently and accurately segmenting images. The inventors disclose herein an improved convolutional neural network system (hereinafter referred to as a "CNN system" or "CNN") and method which is capable of receiving an input image and performing a semantic segmentation on image with greater efficiently and accuracy. One application area that the disclosed CNN system can be applied, is to efficiently and accurately segment floorplan images.

In the computer vision field, image segmentation is, generally, a partitioning process through which the pixels of an input image are identified and classified to thereby enhance processing. Typically, an image segmentation process results in a semantic classification "label" being assigned to every image pixel so that pixels with the same label share certain common characteristics.

Floorplan image segmentation and floor plan image recognition (for example, floorplan feature detection) have become an active area in the computer vision field. Floorplan images are often used in real estate and elsewhere to provide a general spatial understanding of a building layout. Typically, floorplan images may be found in real estate advertising and the image quality may be low. However, the ability to process and extract data automatically from these floorplan images is desirable for a variety of purposes.

To date, the field of identifying/parsing features of a floorplan image has primarily focused on processing high-resolution scans of floorplan images. Generally, previous attempts to parse these types of images have relied on binarization by thresholding image intensity. Image binarization is a technique that attempts to identify walls and other features of the floor plan image, with a '1' or '0'. A '1' usually represents a solid feature such as a wall and a '0' usually represents open space, such as an interior of a room.

This image binarization approach had some success with very good high-resolution images of floorplans utilizing standard floorplan features and design practices. However, the overall results were poor due to the wide variations in floorplan feature representations and floorplan image quality. This floorplan feature representation variation in combination with often old and low-resolution images meant that the previous method of image binarization failed at correctly classifying features of the floorplan images.

Further, interactive two-dimensional (2D) to three-dimensional (3D) conversion of floorplan image data has been attempted. These image conversion techniques also employ image binarization techniques, structure and text separation techniques, and symbol recognition and vectorization techniques. However, due to the difficulties with image binarization techniques noted above, these conversion techniques have failed in providing accurate floorplan feature detection results. Thus, the resultant 3D visualizations have been unsatisfactory.

As can be appreciated, it is desirable to provide a floorplan image recognition and floorplan feature detection technique that can provide accurate analysis of low-resolution floorplan images. Further, it is desirable to provide a floorplan image recognition and floorplan feature detection technique that accurately identifies floorplan features. With the technology disclosed herein, floorplan image recognition and floorplan feature detection, and more specifically, floorplan image segmentation, has been improved to create a device and method which allows a user to obtain a more accurately segmented floorplan image, especially when using a low-resolution input image. By using a standard floorplan image and a combination of a probabilistic representation of the floorplan image and optical character recognition data, a very accurate segmentation of the floorplan can be efficiently produced.

In accordance with an embodiment of the disclosure, a device and method for providing floorplan image recognition and floorplan feature detection utilizing image analysis of low-resolution images is disclosed.

Further, in accordance with an embodiment of the disclosure, a device and method for providing floorplan image recognition and floorplan feature detection that accurately identifies floorplan features is disclosed.

Further, in accordance with an embodiment of the disclosure, a device and method for providing floorplan image recognition has been improved to create a device and method which allows a user to obtain a more accurately segmented floorplan image.

Further, in accordance with an embodiment of the disclosure, a device and method for using a standard floorplan image and a probabilistic representation of the floorplan image is disclosed. Utilizing this device and method, a very accurate image segmentation can be performed.

Further, in accordance with an embodiment of the disclosure, a device and method for providing, without any other information, the probabilistic segmentation of a floorplan image is disclosed. This device and method can be used to determine the floorplan layout.

Because not all probabilistic segmentations of images will provide accurate pixel labeling or adequate floorplan feature labeling, in an embodiment the inventors have created a device and method to improve the probabilistic segmentation result by applying additional image processing and computation.

In accordance with an embodiment of the disclosure, a device and method for iterating the floorplan probabilistic segmentation in conjunction with additional image information using one or more constraints is disclosed. These results then can be compared to each other to determine the most likely floorplan layout.

For example, in an embodiment of the disclosure, a constraint can be a room size ratio check where a room size ratio function can iteratively compare the room size ratio of two rooms determined using the probabilistic segmentation information with additional information such as a known room size ratio determined using optical character recognition of a scanned floorplan image.

In another embodiment of the disclosure, a constraint can be a room accessibility function check where a room accessibility function can iteratively check for a minimum path width between two rooms. That is, the constraint requires that all rooms should be accessible and if a room is not accessible, with a minimum path width between two rooms, then a mistake in using the probabilistic segmented floorplan information likely occurred. These concepts will be described in more detail below.

BRIEF DESCRIPTION OF THE DRAWINGS

The following drawings illustrate examples of various components of embodiments of the invention disclosed herein, and are for illustrative purposes only.

FIG. 2B shows a floorplan image with an indicated area of each room;

FIG. 2C shows a floorplan image with two selected pixels and their associated label probabilities;

FIG. 7A shows a floorplan image with a lack of accessibility to one room;

FIG. 7C shows a floorplan image with proper accessibilities to all rooms;

FIG. 16 shows hardware that can be used to run a CNN system.

DETAILED DESCRIPTION OF THE DRAWINGS

Methodology Overview

Figure 1:
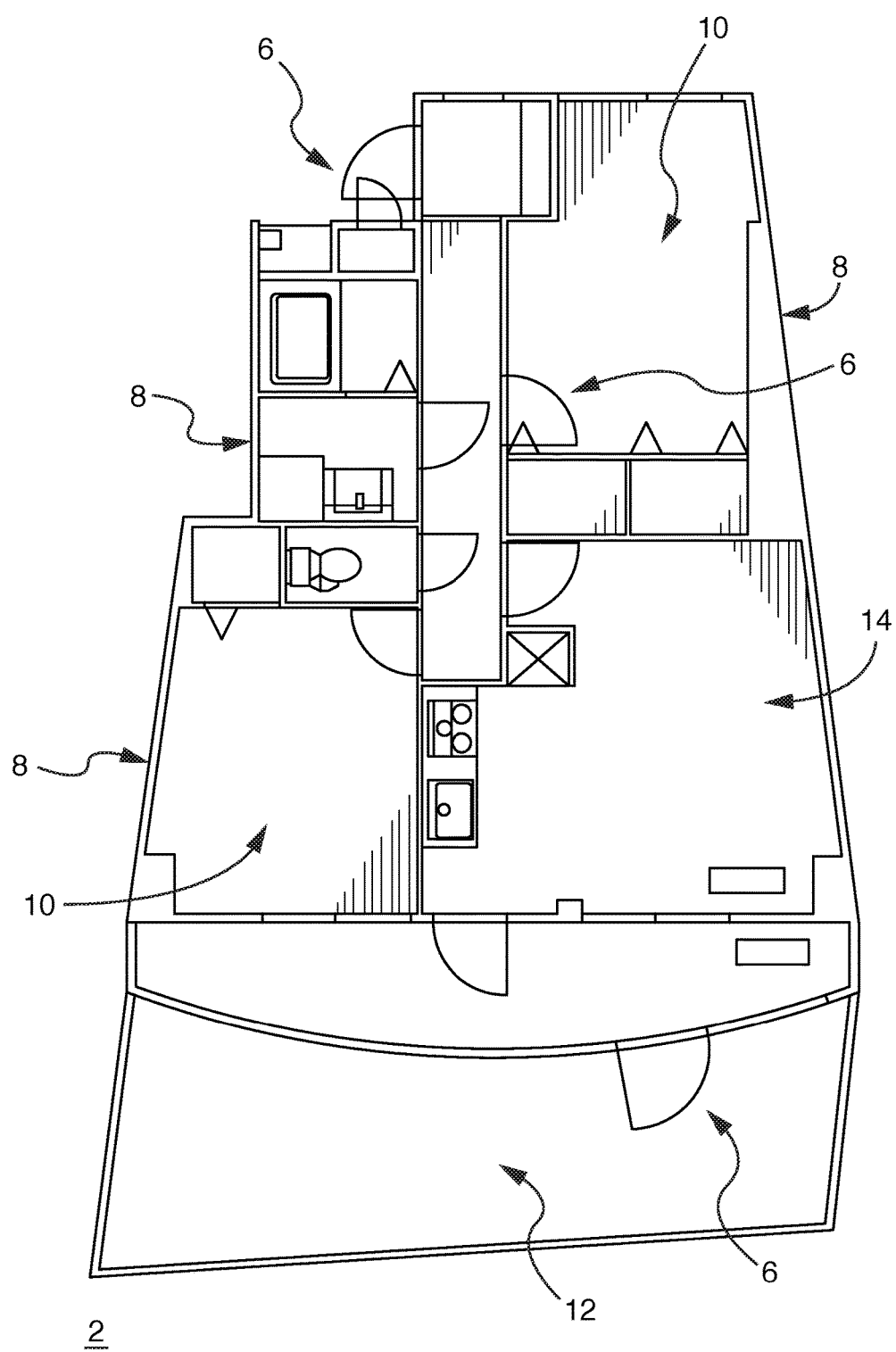
FIG. 1 shows an example of a floorplan image.

As noted above, it is highly desirable to reliably process floorplan image data to correctly identify floorplan features and accurately extract floorplan dimensional data without the necessity of a high-resolution floorplan image. The technology described herein utilizes two different processing technologies, to reliably extract floorplan room features and dimensions from a wide variety of floorplan image data.

The ability to reliably extract feature and dimension information from floorplan image data has a variety of uses. For example, floorplan images could be parsed and dimensional data added to the image's metadata. Such would allow processed floorplan images to be searched or sorted by desired room sizes or ranges. Alternatively, an apartment or home's potential buyer (or lessee) may wish to know if certain furniture will fit inside a room or down a hallway. This question can be answered with floorplan image processing according to the disclosure herein.

Extraction of information from floorplan images is by nature an estimation predicated on assumptions that must be made about the floorplan image. For example, image segmentation is the process of assigning labels to image pixels such that the pixels with identical labels share certain qualities. Thus, one goal of segmentation of a floorplan image might be the labeling of pixel data into "regions" or "areas." This labeling is based on semantics which may vary between floorplan images. For example, an area conventionally termed a "bedroom" in one image may be referred to as "sleeping area", "den" or "loft" in another. Alternatively, the floorplan image may not specifically indicate room usage. Thus, the technology described herein utilizes a set of generic labels such as, for example, "room," "door," "wall," and "outside." These semantic pixel labels are used herein as exemplary labels for floorplan image segmentation processing. Obviously other labels could be used.

The inventive technology described herein employs aspects of convolutional neural network systems (hereinafter "CNN" or "CNN system") which have great potential in image recognition technologies, among other uses. A convolutional neural network can be used to obtain a probabilistic segmentation of a floorplan image. For a discussion of how a CNN system can be implemented, please see U.S. patent application Ser. No. 15/798,349 filed concurrently herewith and hereby incorporated by reference in its entirety.

A trained CNN system, for example, can output a probabilistic segmentation of a floorplan image. A probabilistic segmentation of a floorplan image is a probability that each pixel in the output image is of a certain label; i.e. a semantic identification. For example, when discussing floorplan images, as noted above a pixel label could be a room, a wall, a door, a window, outside, etc. Each of these labels for a given pixel has a probability associated with it. In other words, the probability that a particular pixel is a certain label is known as probabilistic segmentation. This probability can be between 0% and 100%. The combined probability of all of the possible labels of a particular pixel is 100%, according to the model.

However, not all probabilistic segmentations will provide an accurate label to a given pixel thereby accurately reflecting a particular floorplan feature. For example, a particular pixel or area of a probabilistic floorplan image may indicate that a wall is 41% likely, while a door is 40% likely. Thus, if only basing the final floorplan prediction using the probabilistic segmentation, there is not much of a benefit of choosing the wall pixel label over the door pixel label. Thus, the probabilistic segmentation data alone may not yield an accurate result.

The present inventors have created a way to improve the segmentation result with additional image processing and computation. Specifically, the probabilistic segmentation data can be supplemented with raw image data (e.g. JPEG, TIFF. GIF, BMP, PNG) from the target image. As will be seen, by using the additional information that can be gleaned from the image itself, a more accurate floorplan prediction can be achieved.

This raw image data can be separately analyzed using optical character recognition (OCR), and this additional OCR information can be used as a constraint, or test of the probabilistic segmentation data result.

The system herein utilizes a cost function approach for improved floorplan image segmentation and recognition. In particular, a global cost function is defined and then the global cost function is minimized. This global cost function takes into account two processing pipelines of data: (a) probabilistic segmentation of the image into estimated regions based upon semantic labeling (room, door, wall, etc.) and (b) room size estimations based in part upon pixel size. The probabilistic segmentation is derived, for example, from a CNN system and a segmentation cost (the likelihood that the segmentation was proper) is determined. Room size estimations are derived from optical character recognition (hereinafter "OCR" or "OCR processing") processing of the floorplan image where the image includes at least one area labeled with its size in the image. Because image pixel sizes are known, the OCR determined room size can be propagated to other room sizes. Optionally a cost may be determined to account for uncertainties introduced by, for example, confidence in the correctness of the OCR output.

This inventive cost function approach then jointly evaluates the probabilistic segmentation cost and the room size estimation cost. Cost estimation results are consistent due to the inclusion of global constraints on both estimation results. Here, two constraints are proposed although a greater or fewer number of constraints could be utilized.

A first constraint (C1) is that room sizes obtained from (b) (the room size determination based in part upon pixel size determined from the OCR data) must be consistent with the respective room sizes determined by (a) (the probabilistic segmentation of the image). If the calculated room sizes are consistent, confidence in the processing accuracy is increased. However, if divergent room sizes are found, it is likely an error has occurred in the image segmentation process. In this manner, enforcement of a room size constraint serves as an image processing error checkpoint. In a first room size constraint embodiment, this is accomplished by a comparison of relative room ratios, and application of a cost function. In a second room size constraint embodiment, this is accomplished by a direct comparison of processing results. These room size constraint embodiments are more fully described hereinbelow.

A second constraint (C2) requires that each room must be accessible. Accessibility may be defined, for example, as having a door, a sliding door, or an open space (hallway entry) wherein there exists a path having a certain minimum width. If it is determined that a path between two adjacent rooms lacks a minimum accessibility path by enforcing this constraint, it is determined that an error exists in the segmentation hypothesis. For example, a door has been mislabeled as a wall. In this occurrence, the image can be reprocessed to correct the error. In this manner, enforcement of a room accessibility constraint further serves as an image processing error checkpoint As can be appreciated, the use of two processing pipelines of data, namely the segmentation data received from image processing by the CNN system and the OCR data received from image processing by an OCR system, provides distinct data points about the target image. Further, the use of one or more constraints, as disclosed herein, provide processing error checkpoints. The constraints increase data reliability. In this manner, image segmentation and recognition reliability is greatly improved.

Global Cost Function Formulation

Generally, in the field engineering, neural networks, and machine learning, a cost function is an important concept in as much as it is a measure of the output of the neural network. In the area of CNN systems, a cost function returns a number representing how well the network performed to map an input image to a correct output. Learning algorithms such as those implemented by CNN systems search through a plurality of possible solutions to find the solution that has the lowest possible cost.

The global cost function utilized herein for improved image segmentation and recognition is shown below:

$$C_{global}(HS_n, OCR) = \lambda_1 * C(HS_n, PS) + \lambda_2 * C_1(HS_n, OCR) + \lambda_3 * C_2(HS_n, OCR)$$

where $C_{global}$ is the global cost, $HS_n$ is the hard segmentation hypothesis, PS is the probabilistic segmentation, OCR is the optical character recognition result $\lambda_1$ is a first scaling factor and $\lambda_2$ is a second scaling factor and $\lambda_3$ is a third scaling factor. It is noted that if a scaling factor is not desired, the $\lambda$ value can simply be set to 1. Each of the cost function factors will be broadly discussed here and a more detailed discussion provided hereinbelow.

$C(HS_n, PS)$ is the cost function evaluating the likelihood or correctness of a $HS_n$ (Hard Segmentation) output from a given PS (Probabilistic Segmentation) as an input. Broadly, a floorplan image is input into a fully trained convolutional neural network system and a probabilistic segmentation result is calculated. In this process, each pixel of the input image is assigned a probability distribution over the class of possible labels. This output is known as a probabilistic segmentation. Then, a hard segmentation, based upon the probabilistic segmentation, is determined. In this process, each pixel can be assigned the most likely label determined by the probabilistic segmentation. A hard segmentation is simply one of the pixel probabilities. A hard segmentation is not limited to the most likely pixel label, but can be any one of the pixel label probabilities. This hard segmentation data is then evaluated against the systems constraint functions.

$C_1(HS_n, OCR)$ is a cost function penalizing a particular $HS_n$ (hard segmentation) output violation of constraint $C_1$ (i.e. room size consistency). As will be explained hereinbelow, this room size consistency constraint serves as an error check upon a hard segmentation hypothesis based upon room sizes. Here, the cost function is designed in such a manner that if the size hypotheses for each room are consistent when compared between the $HS_n$ data and the OCR data, the $C_1$ cost will be very low, or zero if the room sizes are equal. Size differences, or relative error, increases $C_1$ cost.

Finally, $C_2(HS_n, OCR)$ is a cost function penalizing the same particular $HS_n$ (hard segmentation) output violation of constraint $C_2$ (i.e. room accessibility). As will be explained hereinbelow, this constraint serves as an error check upon a hard segmentation hypothesis based upon room accessibility. Each room, determined by the hard segmentation hypothesis, must be accessible via a door, a sliding door, or an open space. "Access" and "Accessibility" are defined, in this application, to mean that there is a path with a width larger that a certain minimum width. This $C_2$ cost function is defined to be 0 (low cost) if all rooms can be reached with a path with a width of at least $w_{min}$. Otherwise, the $C_2$ cost function returns a positive value.

We will now consider each factor that comprises and impacts the respective individual cost functions that comprises the global cost function used herein. Because of the interrelatedness of the respective cost function components and the utilization of data from two different processing pipelines constrained in a manner to provided consistency of estimation results, we revisit the global cost function hereinbelow after each component element has been fully described.

Room Size Constraint First Embodiment

As noted hereinabove, the room size consistency constraint saves as an error check upon a hard segmentation hypothesis based upon independently determined or estimated room sizes. By utilizing a second data source from the input image, namely by utilizing optical character recognition (OCR) to extract a textual representation of a room size, and by knowing the location of that textual representation, we can compare this data with the room sizes determined by the segmentation output. The higher the correlation between these independently determined room sizes, the higher the likelihood that the image segmentation and recognition was accurately performed.

Figure 3:
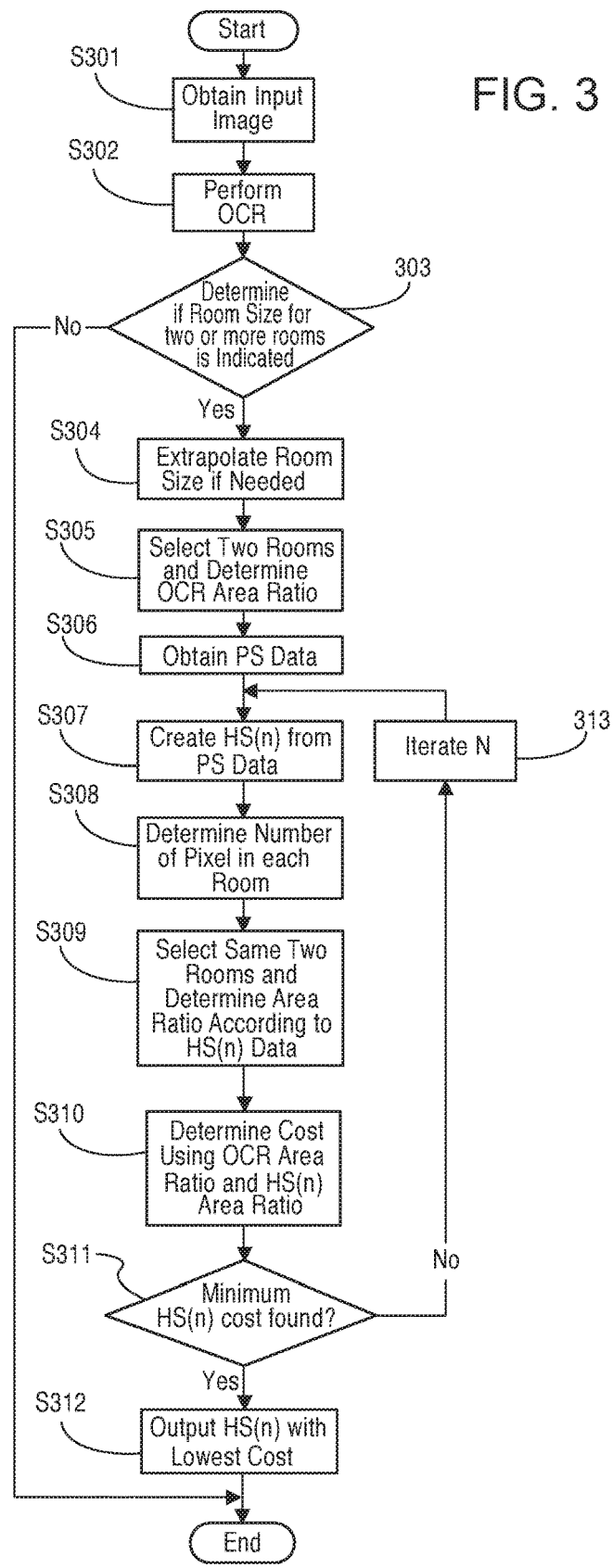
FIG. 3 shows a flowchart process of a room size constraint according to a first embodiment.

FIG. 3 shows a first embodiment for determining a room ratio cost Intuitively, the room ratio cost is the cost of a particular segmentation hypothesis with respect to an area ratio of two rooms, when compared to the expected area ratio of two rooms using an already "known" result. The already known result could be an area ratio of two rooms using an OCR result. The particular segmentation hypothesis is referred to interchangeably in this application as a hard segmentation hypothesis or $HS_n$.

In step 301 of FIG. 3, a floorplan input image to be segmented is obtained. This floorplan input image is not segmented and can be in a JPEG, TIFF, GIF, BMP, PNG, etc. file format. No specific format type is required. An example of an example floorplan input image to be processed by the system disclosed herein is shown in FIG. 2A, with floorplan image 20.

Figure 2A:
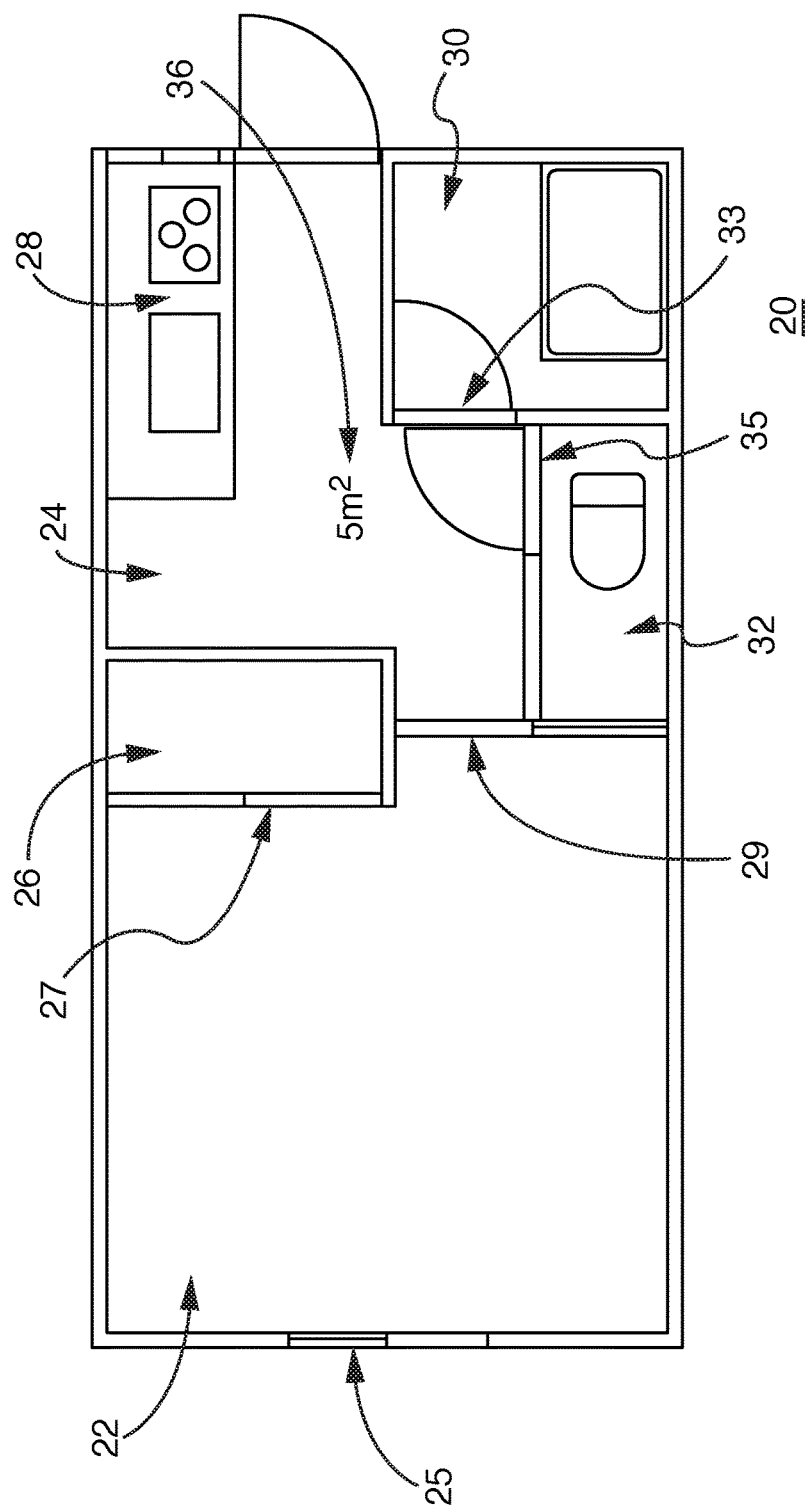
FIG. 2A shows a floorplan image with an indicated area of a single room.

FIG. 2A illustrates a floorplan image 20 that includes a living mom 22, a kitchen area 24, a window 25, a closet area 26, closet door 27, a kitchen counter 28, a bathroom area 32, and a bathroom door 35 for example. This floorplan image also includes written text 36 that describes a room size of the kitchen area 24. For example, the floorplan image 20 indicates that the size of the kitchen area is 5 square meters. In floorplan drawings, the type of room and the size of the room may not always be given. For example, in floorplan image 20, the size of the living room area 22 and the bathroom area 32 are not indicated.

In step 302, OCR processing is performed on the floorplan input image. OCR processing is used to determine what textual information is contained in the input floorplan image. OCR processing is a known technology that can provide accurate information and extraction of alphanumeric data from input images. As such, this OCR processing information may be relied upon to some extent, when semantically determining a floorplan layout. Any number of OCR processing technologies can be used such as those provided by TESSERACT, GOOGLE, MICROSOFT, ADOBE, etc., and the system disclosed herein is not limited to any particular OCR processing technology. However, the system disclosed herein assumes the utilized OCR processing is accurate and recognizes all of the alpha numeric textual information on the image. This includes recognizing any numbers, letters, symbols, etc. on the image. Further, the utilized OCR processing technology is assumed to output the most likely character recognition result or a probabilistic character recognition result, as is conventional in the art.

Figure 2D:
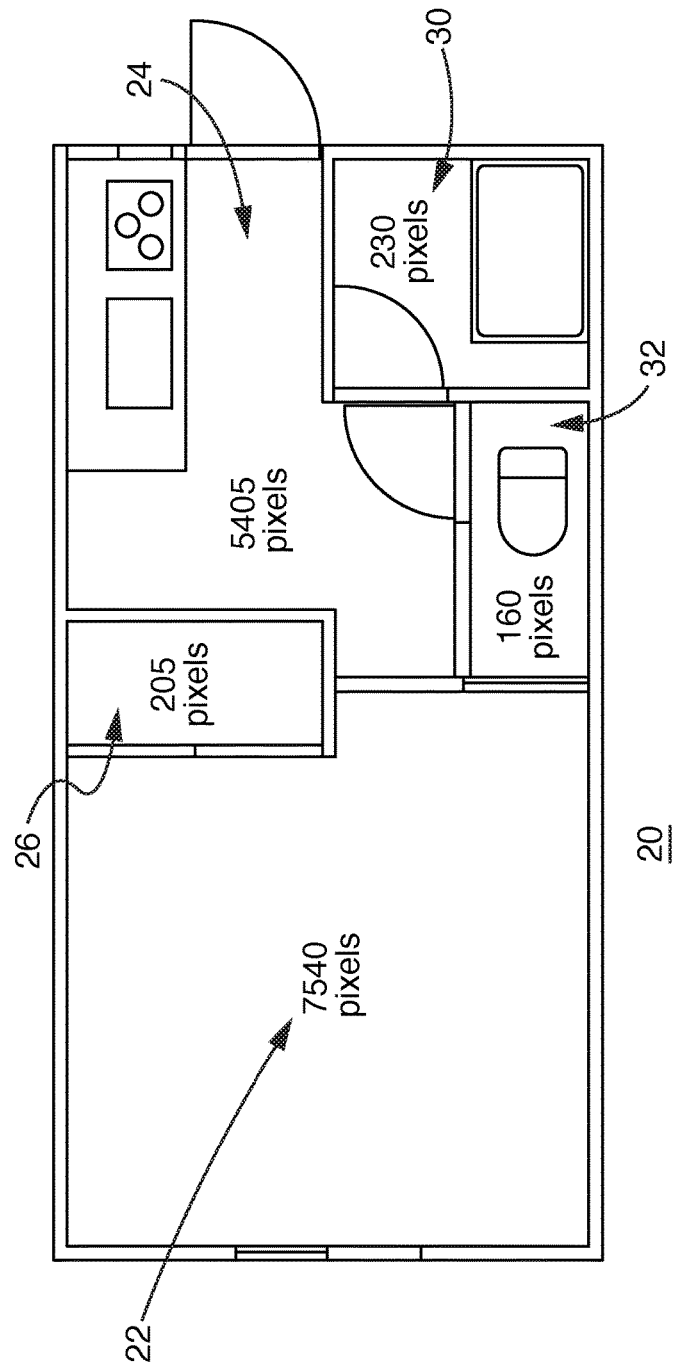
FIG. 2D shows a floorplan image with a pixel count for each room.
Figure 2E:
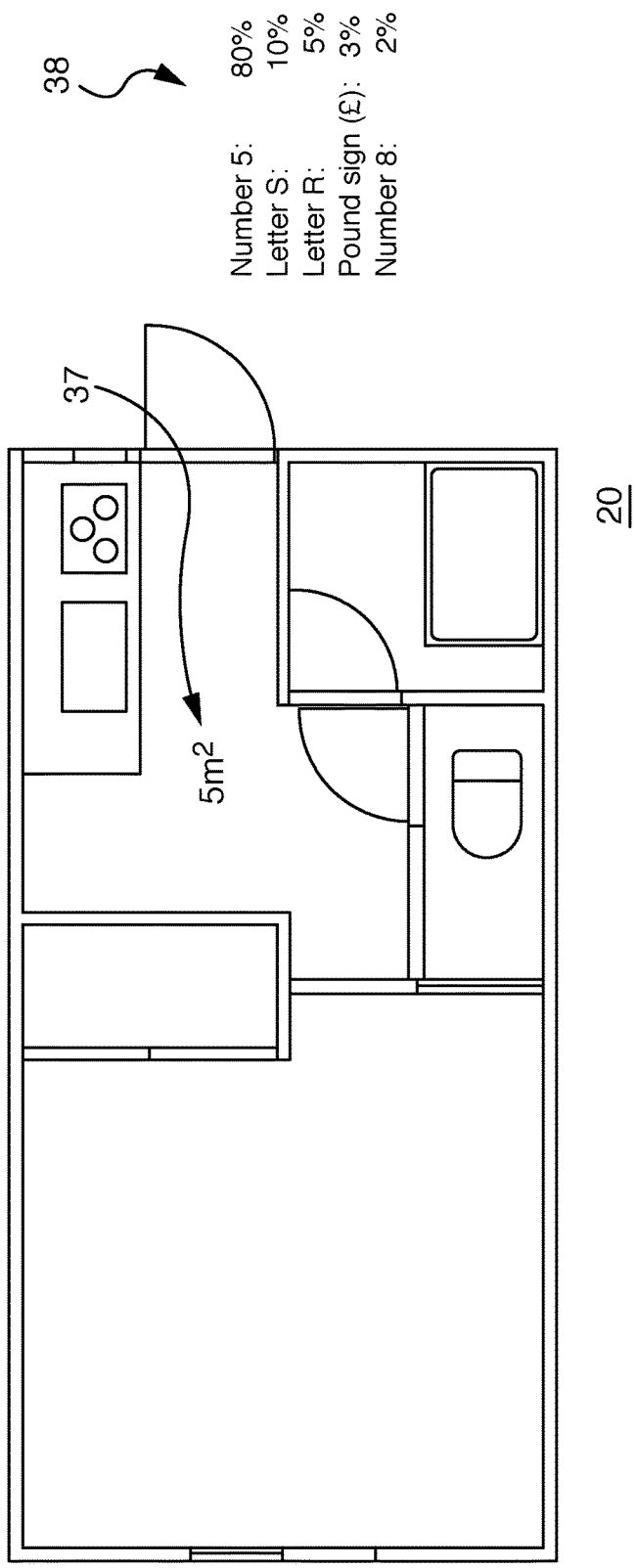
FIG. 2E shows a floorplan image with a probabilistic result for an OCR operation.

For example, as shown in floorplan image 20 of FIG. 2A, kitchen 24 is labeled has an area of 5 $m^2$. This area data point, five meters squared, can be detected by the OCR processing and output and saved in memory. However, OCR processing is not always perfectly accurate and in typical applications, only the most likely character e.g. letter, number, symbol, etc., that matches with the input image is output by the processing system. To address this reliability error, the utilized OCR processing system may output probabilistic data. That is, the OCR processing output may additionally contain an indication of the processing systems confidence it correctly extracted the alphanumeric content from the processed image. An example of an OCR processing output result of this type is shown in FIG. 2E. While kitchen size reference character 37 points to an indicated kitchen size of five square meters, the OCR processing result indicates a set of five possible characters, each character having a specific probability of being correct. For example, as shown by reference character 38 which shows semantic labels, the number 5 has five possible labels or outcomes according to the OCR processing result. For example, kitchen are size 37 is 80% likely to be the number 5, 10% likely to be the capital letter S, 5% likely to be the capital letter R, 3% likely to be the pound symbol (£), and 2% likely to be the number 8. Typically, the OCR processing result with the highest likelihood percentage is chosen as the correct output result. Additionally, it is noted that the probabilistic OCR data can be used to calculate an OCR processing cost in connection with the room size constraint cost calculations discussed more fully hereinbelow.

It bears noting that in addition to detection of any room size alphanumeric representations contained within the input or target image, OCR processing can also provide a location (x-y pixel coordinates) of where the room size is indicated on the floorplan image. This textual location data is utilized by the system for, at a minimum, scaling pixel sizes to room sizes as more fully described hereinbelow. It is assumed herein that room size representations are illustrated centrally in the room they are describing as is conventionally provided in floorplan images. Room sizes that are not centrally depicted potentially introduce error into the processing system. This type of error could also be included in a calculation of OCR cost estimations. Alternatively, if it is determined that OCR room size information is depicted too close to a wall or hallway structure to be reliable, further processing on the room size consistency constraint cost could be halted.

Once a target image has been OCR processed, a determination is made if at least two room sizes were detected, as shown in step 303. A room size could be illustrated in various units such as square feet, square meters, jo (used in Japan), etc., but will typically have a number [e.g. Arabic numeral(s)] indicating the size. If the OCR processing recognizes a number, which, in a floorplan should indicate a room size, then the process continues to the next step 304. However, if a number is not recognized in the image, then this room size constraint process ends as either no room size is provided in the image, or the quality of the image is too poor to perform OCR processing sufficient to extract room size characters.

In step 304, room sizes in other rooms shown in the floorplan are calculated if they were not provided in the original floorplan image. The unknown room sizes are extrapolated from the known room sizes. Preferably, at least two room sizes are found on the target floorplan image in step 303 and during OCR processing. Two OCR detected room sizes enhance reliability of room size extrapolations. It is further noted that these calculations assume the same measurement units are provided on the input image and detected by the OCR scanning. Obviously, if different units have been provided and detected, such as the units Jo for one room area and squared meters for a different room area, appropriate conversion steps are included. This conversion of room size data to a common unit is performed prior to calculating room ratios, extrapolating room size data, or scaling pixel size to room size data.

Figure 8:
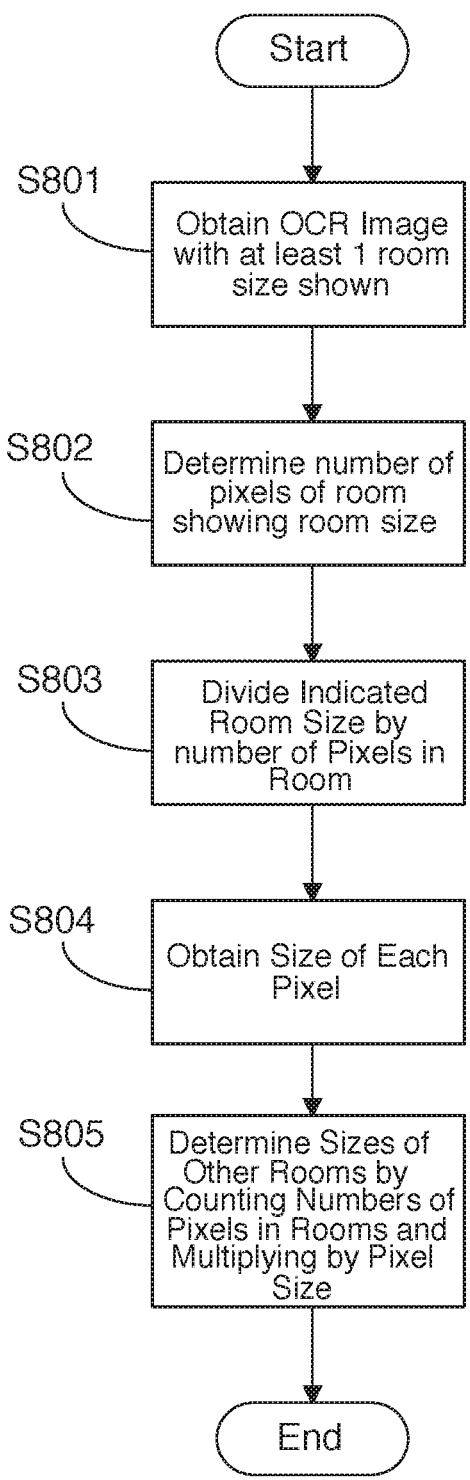
FIG. 8 is a flowchart process of calculating room size based on pixel extrapolation.

An example of this is shown in FIG. 2B. Based on the kitchen are size 36 of five square meters, an extrapolation is made to determine the room size in the other rooms, such as living room area 22 size of 7.5 square meters, a closet area 26 size of 2 square meters, bathroom 32 size of 1.5 square meters and shower room area 30 size of 2.2 square meters. The room size extrapolation could be performed in many ways, but a particularly low computational-cost way to extrapolate room size is shown in FIG. 8, discussed below.

Once at least two or more room sizes of the floorplan image are obtained, two rooms areas are selected and a room ratio of the two selected room areas is obtained in step 305. As indicated above, the OCR cannot recognize the rooms, but only the room size and the location coordinates of the number; e.g. where the number was located in the floorplan image. The system, using hard segmentation hypotheses obtained from the CNN system's processing of the target input image, associates the room size in the correct room for the given hard segment based on where the size of the room was located in the image. That is, according to a hard segmentation hypothesis, the room size is determined to be for a particular room. Thus, even though the OCR operation cannot recognize what is and is not a room, when the OCR result is combined with the hard segmentation hypothesis, a list of rooms and their sizes can be extrapolated from the OCR processing results and the room size constraint can be utilized.

Step 305's room ratio is created by dividing the first room area by the second room area. For example, as shown in FIG. 2B, the kitchen 24 has an indicated area of five square meters and the living room 22 has an indicated area of 7.5 square meters. Dividing 5/7.5, obtains a kitchen-to-living room room ratio of 0.667. This can be done for any two rooms for which there is a known room area. The more room ratios that are calculated, the more precise a room ratio cost can be determined. Thus, it is preferable to calculate a room ratio for multiple room sets in the floorplan if possible.

Once a room ratio of the unsegmented image is obtained, the information is set aside (held in storage) to be used later, and the probabilistic segmentation (PS) information is obtained from the CNN system in step 306. A probabilistic segmentation is a range of probabilities, or the likelihood that a particular pixel on an image is properly associated with a given semantic label.

FIG. 2C illustrates a probabilistic segmentation output by, for example, a convolutional neural network system (CCN). FIG. 2C is very simple and only shows two pixels, 44 and 42. The probabilistic image could have thousands or millions of pixels, each with their own probability of being certain labels. A probabilistic segmentation from a CNN is only one method of obtaining a probabilistic segmentation of floorplan image 1 and the present invention is not limited to this method. Using FIG. 2C as an example, pixels 42 and 44 are two pixels located on a floorplan image 40 that includes probabilistic segmentation information. In this example, pixels 42 and 44 could be any one of five different labels: door, wall, room, window and outside. In practice, the number of labels can be much greater, but for illustrative purposes, the number of pixel labels has been limited to five.

According to the probabilistic segmentation shown in FIG. 2C, pixel 44 is 99% likely to be a room, 0% likely to be a door, 0% likely to be a wall, 0% likely to be a window and 1% likely to be outside (of the floorplan). On the other hand, the probabilistic segmentation result for pixel 42 is much more uncertain. According to the probabilistic segmentation shown in FIG. 2C, pixel 22 is 20% likely to be a room, 40% likely to be a wall, 30% likely to be a door, 5% likely to be a window and 5% likely to be outside. The probabilistic segmentation data contains probabilities for every pixel in the image, but for illustrative purposes, only two pixels are shown.

Using the probabilistic segmentation data from step 306, a hard segmentation hypothesis is performed in step 307. This hard segmentation hypothesis is represented as $HS_n$, where HS stands for hard segmentation and n represents the particular hard segmentation hypothesis or iteration. Many hard segmentation hypotheses can be generated from the probabilistic segmentation data. The first hard segmentation hypothesis can be obtained by selecting a maximum value of the label for the probabilistic segmentation, for example. For example, FIG. 2C shows two pixels 42 and 44. Using the maximum probability value, the first hard segmentation hypothesis for pixel 42 is a wall and the first hard segmentation hypothesis for pixel 44 is a room. For every hard segmentation hypothesis, each pixel will have a hypothesized label. As indicated above, a floorplan image could have thousands or millions of pixels.

Once a hard segmentation hypothesis is determined in step 307, the number of pixels per room, for at least two rooms, are determined in step 308. This can be done by simply counting the number of pixels in each of the rooms for the hard segmentation hypothesis $HS_n$. These pixels have been labeled "room." An example is shown in FIG. 2D where each room area has been associated with a pixel count number (not drawn to scale). The number of pixels in each room will not provide absolute information on the room size, but can provide information on the relative room size, that is, the ratio of the room sizes. This is true because floorplan images have a consistent scale throughout the image.

In step 309, the same two rooms are selected as the selected rooms in step 305, for example the kitchen 24 and living room 22. A pixel count for the first and second room of the segmented image is obtained in step 308 and the respective pixel counts are divided, the same as in step 305.

Using FIG. 2D as an example, the kitchen 24 has 5405 pixels while the living room 22 has 7540 pixels. Dividing 5405/7540 gives a kitchen-to-living room room ratio of 0.717.

Next in step 310, a relative cost of the particular hard segmentation hypothesis $HS_n$ room ratio is performed. To determine the relative cost in step 310, a cost function can be used. Cost functions can be used to quantify the amount the predicted value deviates from the actual value (or assumed actual value).

For example, the room ratio cost can intuitively be thought of in the following way. Assuming the room ratio using the OCR data is accurate, the hard segmentation hypothesis with the closest room ratio to the OCR room ratio is desired. In the example discussed above, the OCR room ratio is 0.667 while the particular $HS_n$ room ratio is 0.717. Closer room ratios tend to indicate that the hard segmentation hypothesis is accurate and more distant room ratios tend to indicate that the hard segmentation hypothesis is inaccurate. If for example, the $HS_n$ room ratio was 5.3, this would be very different than the OCR room ratio of 0.667 and thus would tend to indicate that the hard segmentation hypothesis $HS_n$ was not correct. For a more detailed explanation of calculating costs, including calculating probabilistic segmentation costs and OCR deviation costs, please see the discussion of cost functions as discussed in FIG. 9.

For the cost in step 310, besides calculating a room ratio cost, various other potential costs can be analyzed in alternative embodiments. For example, a probabilistic segmentation cost, a room ratio cost and an OCR processing deviation cost could be calculated. The other potential costs could be used to calculate a global cost (discussed below), if desired.

Figure 12:
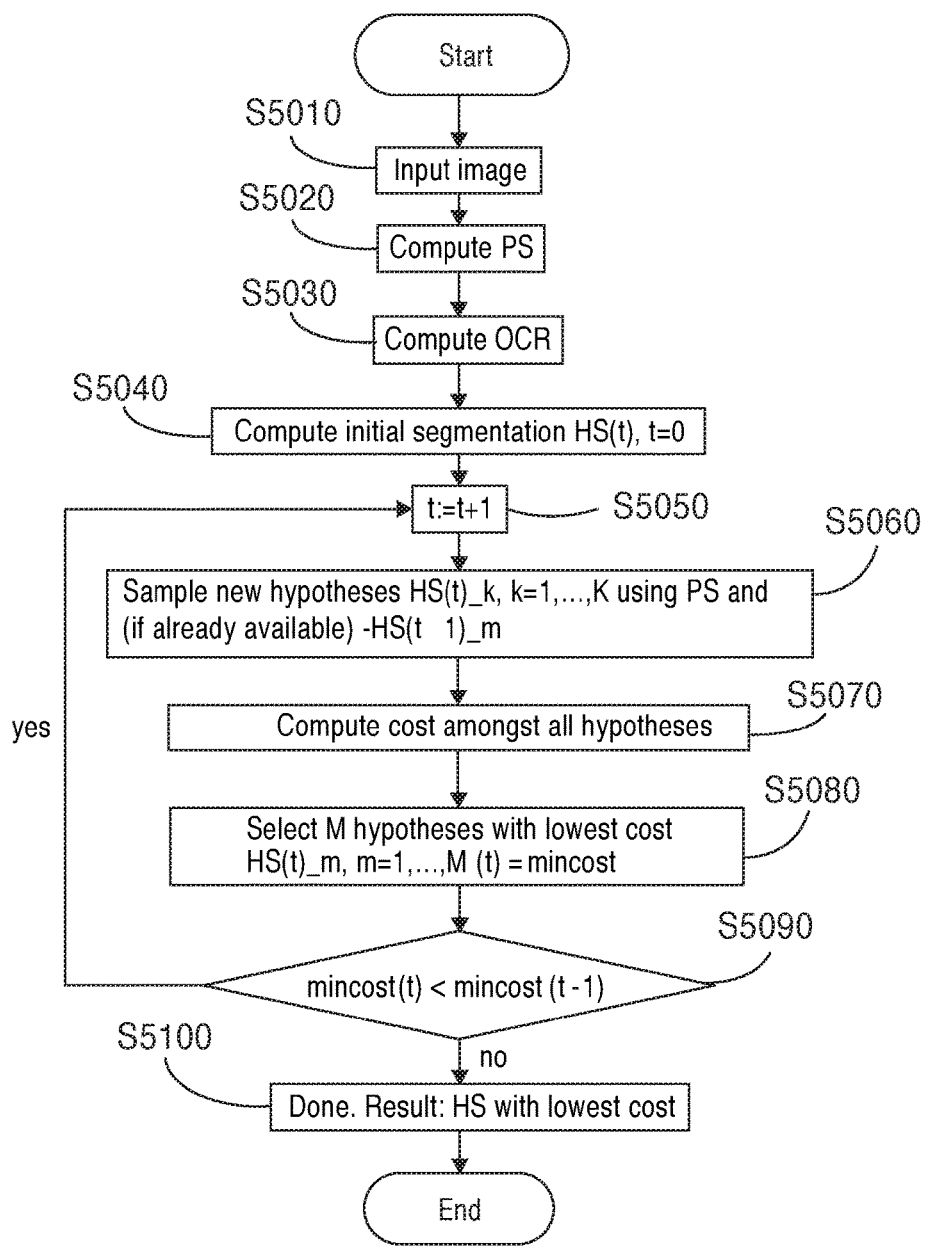
FIG. 12 shows an optimization process of a CNN segmentation system.

Once a cost has been determined for a specific $HS_n$ in step 310, a determination is made as to whether the number of hard segmentations has produced a minimum cost, in step 311. For example, to be confident that the minimum cost for a hard segmentation hypothesis has been found, an optimization of the cost function can be performed. That is, the $HS_n$ can be iterated until the minimum cost of the cost function has been found. If a minimum cost has not been found in step 311, then the $HS_n$ is iterated in step 313 and another hard segmentation hypothesis is tested, repeating the process from step 307. In step 313 we can iterate the hypothesis. We can also look for iterations which maintained pixel continuity, but this should already be built in to the probability segmentation This process repeats until a minimum $HS_n$ cost is found. An example of finding a minimum cost is shown in FIG. 12 and discussed in more detail below.

Once, this minimum cost is found, the $HS_n$ with the minimum cost is determined to be the best segmentation solution for the floor plan, at least with respect to the room ratio constraint. Other constraints can also be used in this process, as discussed below. This cost is then output in step 312. The $HS_n$ with the lowest cost and the $HS_n$ cost function can be a final step in the improved segmentation and recognition device, or it can be used in conjunction with different constraints, such as an accessibility constraint discussed below, to further refine the room segmentation.

Further, the room constraint can be determined for only a pair of rooms, or all of the room pairs in the floorplan could be determined to ascertain the total hard segmentation cost.

As can be seen, as a result of the room size constraint processing, we are left with a list of size hypotheses for each determined room as determined by the minimum hard segmentation output HSn function. We also have a list of room size hypotheses for each image area as determined by and/or extrapolated from the OCR results. By comparing ratios of sizes, area units become irrelevant. A ratio of pixel sizes (determined via CNN processing) reduces to a number, and a ratio of units squared (determined via OCR processing) similarly reduces to a number, and these numbers can be compared given that they each represent the same two areas of a given floorplan. Thus, we now have the data required to compare room size segmentation hypotheses for each room with data obtained from an OCR processing and determine an overall cost function C1 for the room size constraint. This is more fully discussed hereinbelow with respect to FIG. 9.

Room Size Constraint Second Embodiment

Figure 4:
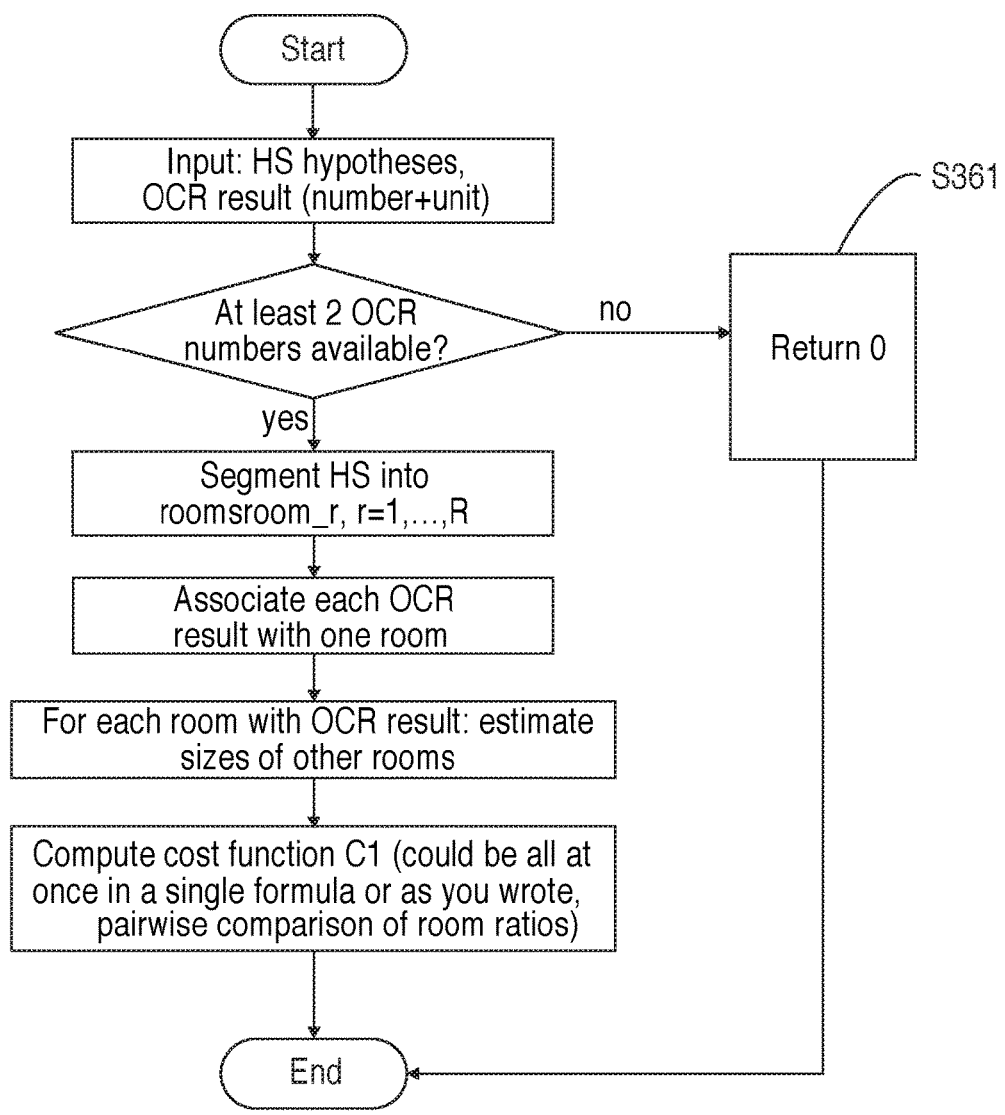
FIG. 4 shows a flowchart process of a room size constraint according to a second embodiment.

A second embodiment of a room size constraint is shown in FIG. 4. This embodiment is capable of simultaneously processing a set of hard segmentation hypotheses at the same time. Thus, a result can converge more quickly than in the first room size constraint embodiment.

As shown in step 351, a set of hard segmentation hypotheses are input, along with an OCR result. Similar to the embodiment discussed above, the OCR result is typically an Arabic numeral along with a unit, such as meters, jo, feet, etc. Further, similar to the embodiment discussed above, the initial set of hard segmentation hypotheses are obtained from the CNN system.

Once the OCR results and hard segmentation hypotheses are acquired, a determination is made as to whether or not at least two OCR numbers are available in step 354. The reason that two OCR numbers are needed is that if only a single OCR number is available, and used to extrapolate the sizes of the other rooms, any error in the initial OCR number/room will propagate to the other rooms. Then, when a comparison is done between the ratios of the rooms using the OCR result and a particular hard segmentation hypothesis, the result will be trivial because the OCR room sizes will necessarily be self-consistent with the hard segmentation room sizes, as only a single data point was used to extract the room sizes for the particular hard segmentation hypothesis. Therefore, in this embodiment, at least two OCR numbers/room sizes are desired to properly perform the constraint. This will also become clearer with the discussion of steps 358 and 360.

In step 352, it is determined if at least two OCR numbers are available. If at least two OCR numbers are not available, then the process ends and a zero is returned in step 361. If at least two OCR numbers are available, then the process proceeds to step 354. In step 354, a set of hard segmentation hypotheses are used for each of the rooms to be compared with the OCR result. For example, a first hard segmentation hypothesis may estimate the living room 22 to be 7540 pixels, while a second hard segmentation hypothesis may estimate the living room 22 to be 9000 pixels. This can be performed for each room in the hard segmentation hypothesis.

Next in step 356, an OCR result is associated with a given hard segmentation hypothesis. As discussed above, associating this OCR result for a given room is based on a particular hard segmentation hypothesis and the OCR's ability to output an X-Y pixel location for the extracted alphanumeric data. For example, the OCR result for kitchen 24, as shown in FIG. 2A, would be placed in the corresponding location and room for the hard segmentation hypothesis. Thus, kitchen 24, according to the OCR result, would be assigned a size of 5 $m^2$, for the particular hard segmentation hypothesis. This is done for all rooms with an OCR result.

In step 358, for each room with an OCR result, the size of the other rooms can be estimated. Thus, if the OCR result for kitchen 24 is 5 m², a size per pixel can be extrapolated for the particular hard segmentation hypothesis. See FIG. 8 for a discussion of extrapolating a room size based on OCR data and a segmentation hypothesis. That is, the number of pixels can be counted and the number of pixels can be divided by the area of the room to find the area per pixel. This process can be viewed, in effect, as a scaling of the real-world room size represented by the floorplan image to the floorplan image size on a pixel by pixel basis.

The number of pixels in the other rooms can then be counted and an area or room size can be given to each of the other rooms, for the given hard segmentation hypothesis and the given OCR result. Next, this process can be repeated for a room with another OCR result. This is done for every room with an OCR result. Based on this information a cost can be computed for the deviation between the most likely hard segmentation result and the actual hard segmentation result.

Next, in step 360, a cost can be determined for each hard segmentation hypothesis using a cost function. The cost of multiple hard segmentation hypotheses can be calculated in a single iteration. That is, the cost of each hard segmentation hypothesis in the set of hard segmentation hypotheses can be calculated. This cost can be thought of as the deviation from the expected value. Please see the discussion below of an implementation of a cost function.

Figure 5A:
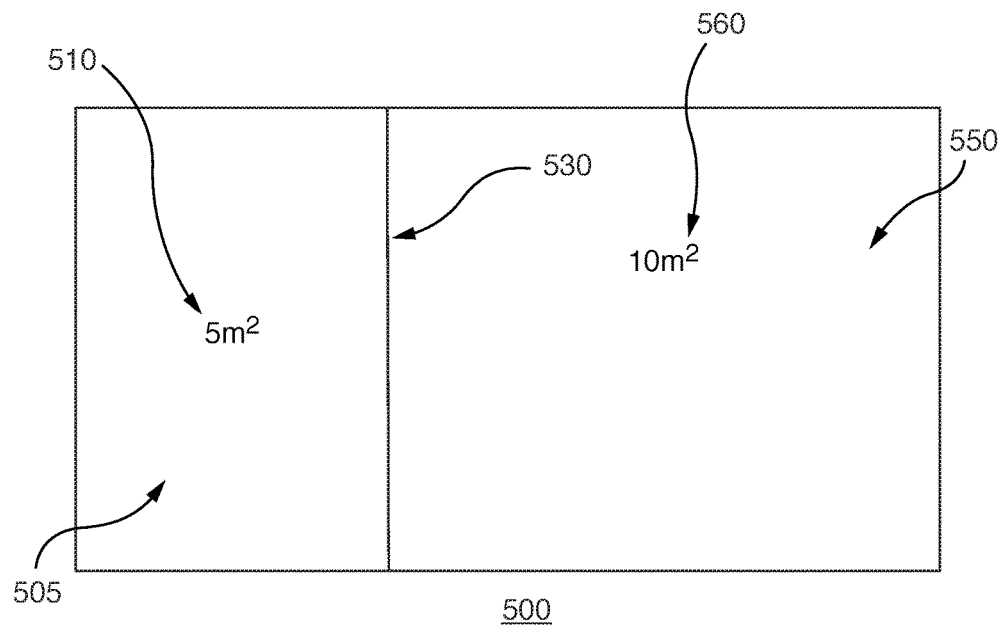
FIG. 5A shows a simplified floorplan image according to a second embodiment.

Looking at the example in FIG. 5A, floorplan 500 shows two rooms 505 and 550. Room 505 shows an OCR result of 5 m², identified by room size 510, while room 550 shows an OCR result of 10 m², identified by room size 560. Wall 530 is shown as dividing the rooms, but according to the OCR operation, wall 530 is not known; only the results of 5 m² and 10 m² are known.

Figure 5B:
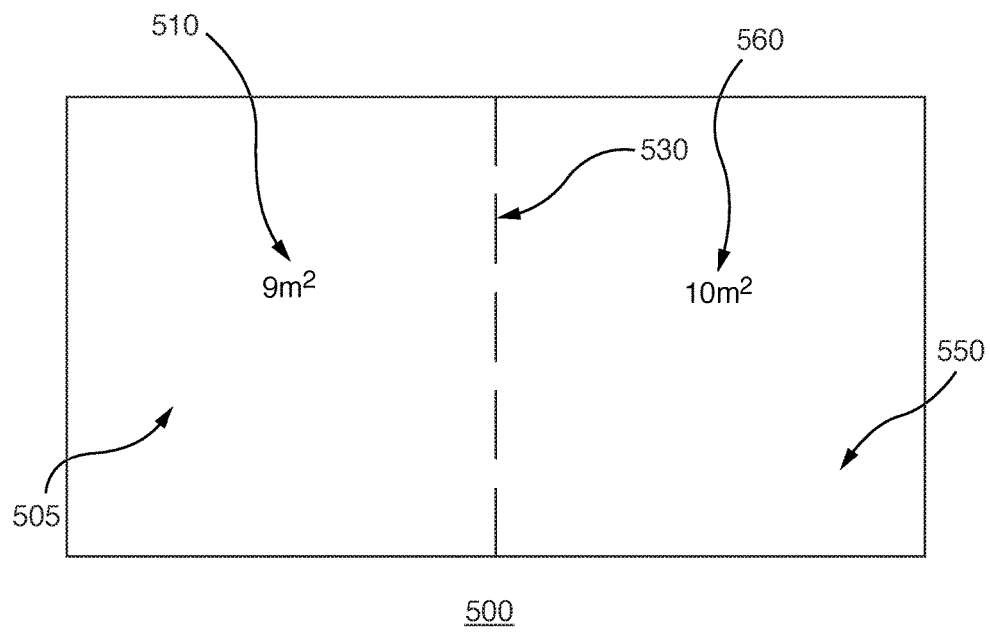
FIG. 5B shows a simplified floorplan image according to a second embodiment.

FIG. 5B shows a first hard segmentation hypothesis. Wall 530 is shown in a dotted line to show the hard segmentation hypothesis. Using the OCR result from only room 550, it is possible to determine the size per pixel of the particular hard segmentation hypothesis. In this example, the number of pixels in room 550 is 916 pixels. Thus, the size of each pixels is 0.011 m². Using this pixel size, it is possible to then determine the room size of room 505. Based on the particular hard segmentation hypothesis, it is known that there are 824 pixels in room 505. Multiplying 824 pixels*0.011 m²/pixel gives an area of 9 m². Thus, the area of room 505, according to the first segmentation hypothesis is 9 m².

Figure 5C:
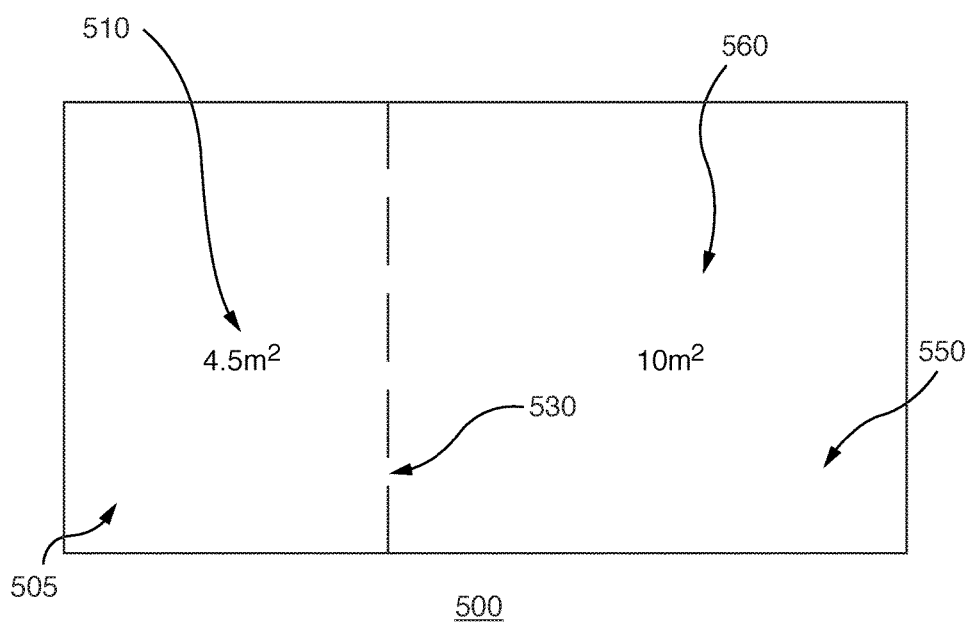
FIG. 5C shows a simplified floorplan image according to a second embodiment.

Next, this procedure is repeated using the same OCR value, but a different hard segmentation hypothesis, a second hypothesis, as shown in FIG. 5C. First, the size per pixel of room 550 is determined using the same procedure as above. The OCR value of room 550 is 10 m² and there are 1200 pixels in room 550. Thus, the size per pixel is 0.0083 m². Using this pixel size, it is possible to then determine the room size of room 505. Based on the particular hard segmentation hypothesis, it is known that there are 540 pixels in room 505. Multiplying 540 pixels*0.00833 m²/pixel gives an area of 4.5 m². Thus, the area of room 505, according to the second segmentation hypothesis is 4.5 m².

Using the OCR result for both rooms, it is possible to compare the results of the first and second hard segmentation hypotheses. For Example, in the first hard segmentation hypothesis, the size of the rooms was similar based on the number of pixels in each room; room 505 was determined to be 9 m² and room 550 was assumed to be 10 m². The result of the size of room 505 can be compared to the OCR result for room 505, which was 5 m². Thus, the first hard segmentation hypothesis does not match very well with the OCR results.

Looking at the second hard segmentation hypothesis, room 505 was calculated to be 4.5 m² and room 550 was assumed to be 10 m². This result closely matches the OCR results which show a first room size of 5 m² and a second room size of 10 m². Therefore, when the cost function is used to determine the costs of the different segmentation hypotheses, the first hard segmentation hypothesis will have a higher cost than the second hard segmentation hypothesis.

Accessibility Constraint: Third Embodiment

In determining a floorplan layout, some basic information is already known without having to analyze any given floorplan. For example, every room must have an entrance, e.g. doorway, hallway, stairway, etc. If, after segmentation processing of a floorplan image, an area that is labeled as a room does not have any way to enter/exit, then it can safely be assumed that a mistake has been made in determining a floorplan's segmentation.

For example, mistakes such as mislabeling a door as a wall, or mislabeling a hallway as a window, could result in a room lacking an entrance. This information can be used to help determine the proper semantic labeling of floorplan images by checking the results of the floorplan image. The present embodiment utilizes this room accessibility requirement as a second constraint for increasing image segmentation reliability.

As shown in FIG. 2A, floorplan image 20 includes a living room area 22, a kitchen area 24, a window 25, a closet area 26, a kitchen counter 28, a bathroom area 32 and a shower room area 30, for example. This floorplan also includes written text 36 that describes a room size of the kitchen 24. For example, the floorplan image 20 indicates that the size of the kitchen is 5 square meters. In floorplan drawings, the type of room and the size of the room may not always be given. For example, in floorplan image 20, the size of the living room 22 and the bathroom 32 are not indicated.

Figure 6:
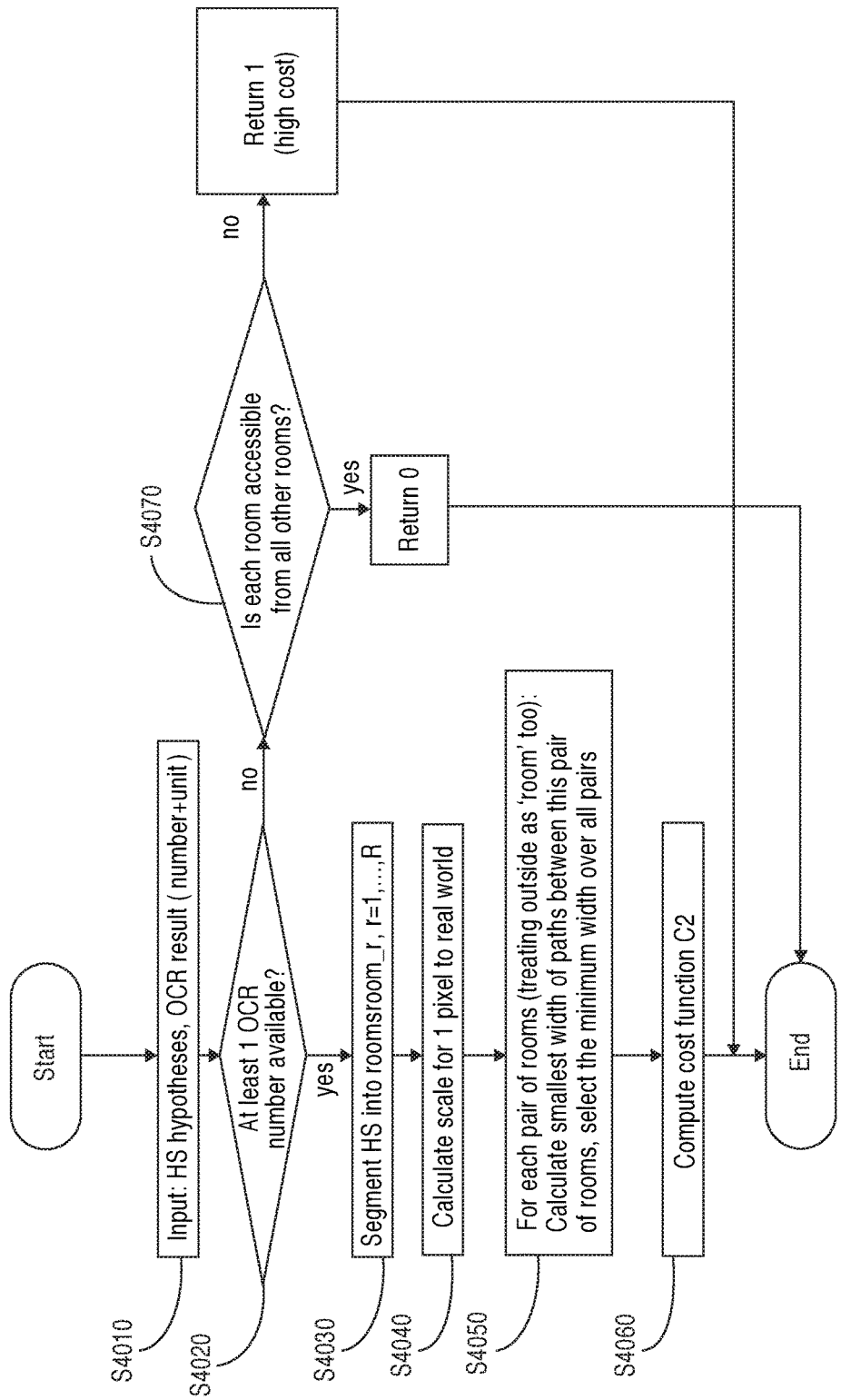
FIG. 6 shows a flowchart process according to a third embodiment.

FIG. 6 shows a process of implementing an embodiment of an accessibility constraint. This embodiment uses an accessibility constraint to help determine the proper image segmentation. That is, based on the assumption that rooms need to have an entrance/exit, and that the size of the entrance/exit should be at least a minimum size, the CNN system can determine a more likely segmentation result or, in the case of a floorplan image, a more likely floorplan.

In step 4010, a set of hard segmentation hypotheses and OCR processing results for an image are input into the system. A discussion of how hard segmentation hypotheses and OCR results for a target input image have been provided above. The accessibility constraint embodiment utilizes this previously generated data.

In step 4020 a determination is made if at least one OCR result is available. At least one OCR result is desirable so that a size of a room opening can be ascertained. If no OCR result is available, a simplified room accessibility check is performed.

This simplified room check is shown in step 4070. In step 4070 a determination is made as to whether there is an opening, irrespective of the opening size, in each room. This simplified check might comprise, for example, a determination of pixels labeled "room" and then checking the room's edge pixels to ascertain if a group of pixels are labeled "door." Alternatively, when it is determined that two areas of pixels are labeled room and they are separate by a "wall", a check could be structured to determine if there is an opening (passageway, hallway) in that labeled wall. Other alternative simplified check algorithms are also possible. If there is an opening found, the cost for the particular segmentation will be determined to be low (e.g. 0) in step 4075, and if there is not an opening for every room, the cost of the particular segmentation will be high (e.g. 1) in step 4080.

If an OCR result is available, then in step 4030, the rooms in the hard segmentation hypothesis are set, and in step 4040, a scale for each room is calculated based on the previously obtained OCR processing result. In other words, as discussed above, a size per pixel can be determined using an OCR result for a given room and counting the number of pixels in the room. Please also see FIG. 8 for how to determine a pixel scale. Based on this data, all room sizes in the hard segmentation hypothesis can be determined by simply counting the number of pixels in a room and multiplying by the area/pixel value determine above.

Next, in step 4050, for each pair of rooms in the hard segmentation hypothesis, (noting that here, any pixels labeled "outside" are also treated as a "room"), a calculation is made to determine the smallest path width between every room pair. The order of selecting the rooms for analysis does not matter any room may be selected first. However, once a room is selected and an accessibility analysis has been performed, the room need not be analyzed again for accessibility constraint purposes. In other words, using floorplan image 20 of FIG. 2A as an example, a minimum width path between shower room 30 and living room 22 is calculated. Looking at FIG. 2A, the limiting areas of the minimum width path would be the shower room door 33 and sliding door 29. Thus, the smaller of these two values would be the minimum path width for calculation purposes in step 4050. This process would be repeated for every room pair and the minimum width for every room pair would be selected.

As discussed above, each room needs to have at least one opening so that it is accessible. The size of every $room_n$ opening is determined. Some rooms may have multiple openings. If $room_n$ is determined to not have any opening, this information is also determined. In this situation, an error in segmentation labeling has likely occurred The final step 4060, is to calculate the cost function with respect to accessibility constraint as discussed below.

Figure 7B:
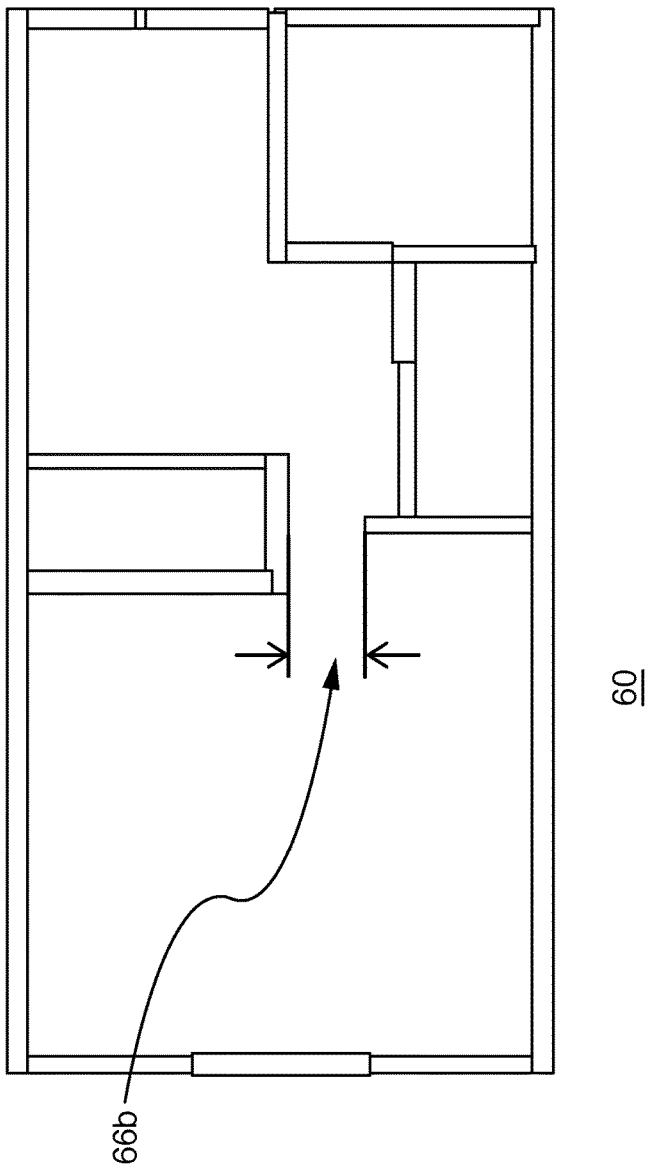
FIG. 7B shows a floorplan image with an overly small accessibility to one room.

For example, FIG. 7A illustrates a room where, when room 22 was checked in floorplan 60, no opening was determined to exist. That is, at shown by 66a, a minimum opening does not exist, and in fact, no opening exists. In this situation, the cost C2 has been set to 1 (high cost) indicating a high likelihood that a segmentation error has occurred because the segmentation process has returned a result where a room fails to have a minimum accessibility, and even a room without an opening. When a path width is determined to be small, i.e. smaller than the predetermined minimum path width, as is illustrated by element 66b of FIG. 7B, the function returns a medium cost, for example 0.5. Finally, when the path width between two rooms is determined to be sufficiently wide and is larger than the minimum accessibility constraint width, as shown in FIG. 7C, the cost function C2 returns a value of 0.0 indicating that the hard segmentation processing is likely valid. Thus, the hard segmentation hypothesis with the lowest cost when processed by the accessibility constraint embodiment would be selected as the most likely segmentation hypothesis.

Pixel Size Extrapolation

FIG. 8 is a flowchart process of calculating room size based on pixel extrapolation. This process is useful in both the room size ration constraint calculations and in the room accessibility constraint calculations. Beginning at step 801 in FIG. 8, an OCR image with at least 1 room size shown in the OCR image is obtained. In step 802, the number of pixels in the room with a size shown is counted. In steps 803 and 804, the room size (area) is divided by the number of pixels to obtain an area/pixel. Next, in step 805, the sizes of other rooms in the floorplan image can be determine by counting the number of pixels in each room and multiplying by the determined area/pixel calculated in step 804.

Cost Function of Room Ratio Segmentation:

Cost functions can be used to quantify the amount the predicted value deviates from the actual value. For example, a cost function can be used to evaluate a deviation from an ideal room ratio. Further, a cost function can be used to evaluate the deviation from a probabilistic segmentation with a hypothesized hard segmentation $HS_n$. A cost function could also be used to evaluate the deviation from an ideal OCR result compared to a hypothesized test.

Figure 9:
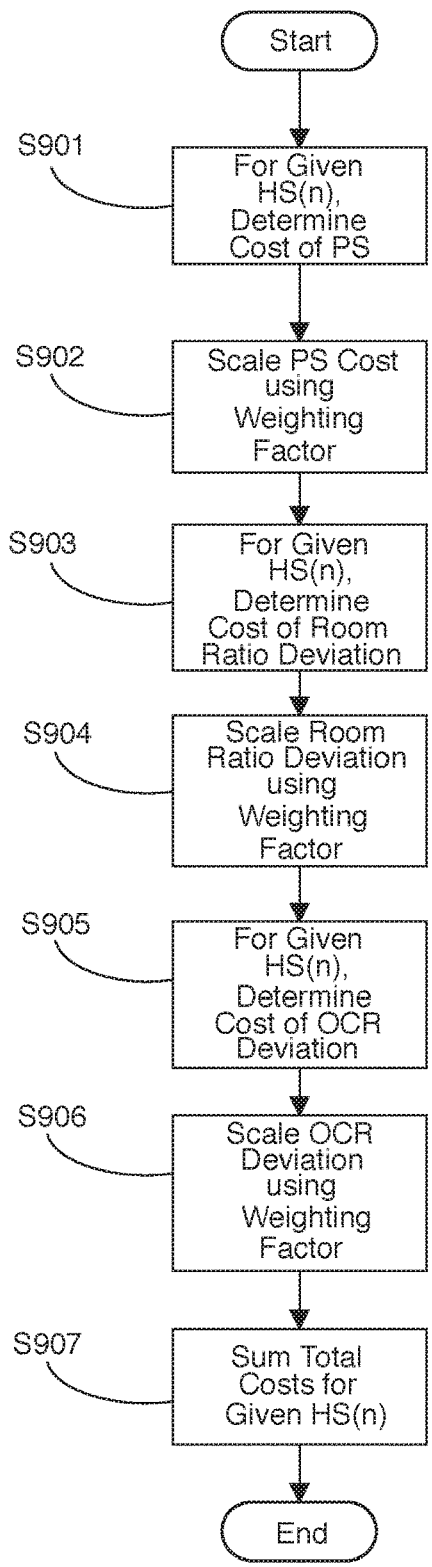
FIG. 9 is a flowchart process of determining room ratio cost for a hard segmentation hypothesis.

FIG. 9 is a flowchart showing one way to calculate a cost of a room ratio deviation as discussed in the embodiments above. The first cost is determining, for a given $HS_n$, the deviation from the probabilistic segmentation, as shown in step 901 of FIG. 9. Intuitively, this is the cost when using a label that is less than 100% likely. The more unlikely the label used, the higher the cost.

For example, the lowest cost of pixel 44 of FIG. 2C would be using the label of wall, the next lowest cost would be using the label of door, the next lowest cost would be using the label of room and the two highest costs would be using the label of window or outside. Of course, as mentioned above, this example only has five possible labels for ease of illustration, but many more labels could also be possible.

Using the probabilistic values shown in FIG. 2C for pixel 42, the most likely label of the pixel is a wall, at 40%. Thus, if the hypothesized hard segmentation considers the pixel 42 to be a wall, then the cost associated with this is lower than any other cost, as this is the most likely label. If the hypothesized hard segmentation considers pixel 42 to be a door, which has a 30% likelihood, then a low cost would be associated with this label, but the cost would be higher than the wall label cost. If the hypothesized hard segmentation considers pixel 42 to be a room, then the associated cost has a medium value, higher than the wall or door cost. If the hypothesized hard segmentation considers pixel 42 to be a window or outside, which has a 5% likelihood, then the associated cost is high as this is unlikely. Of course, only 5 labels are shown and the number of labels could be significantly higher. As the likelihood of a pixel being a particular label decreases, the associated cost increases.

Written as a formula, the cost of a particular hard segmentation $HS_n$ is:

$$\text{Probabilistic Segmentation Cost}(PS, HS_n) = \sum_i \log p_j(i)$$

Here i is an index over all pixel positions in the images HS (i=1, . . . , width*height) and j is an index of labels (e.g. j=∈ (wall, room, . . . etc.), and $p_j(i)$ is the probability of label j at pixel i.

Once a cost for the probabilistic segmentation is calculated, the cost can be weighted in step 902. The weighting could be a simple scaler, or it could be a learned weight in a neural network. For example, if the probabilistic cost was less important than a room ratio cost, the room ratio cost could be scaled up or the probabilistic cost could be scaled down.

Next the cost of the room ratio deviation is determined in step 903. As briefly discussed above, the larger the difference in the calculated room ratios of the $HS_n$ room ratio and the OCR room ratio, the larger the cost. To calculate this ratio, the following formula could be used:

$$\text{Room Ratio Cost}(HS_n, OCR) = \frac{1}{R}\sum \frac{(|\max_i(j)|*|size_{r,i} - size_{r,j}|)}{\max_k(size_{r,j})}$$

In the above equation, for each room, room$_r$, r=1 . . . , R (from segmentation HS), a list of hypotheses: size$_{r,i}$, . . . , size$_{r,M}$, each size estimate from one OCR result, given there are M OCR results. The term $(|\max_i(j)|*size_{r,i}-size_{r,j}\equiv)$ is used to normalize the room size and the term $(|\max_i(j)|*|size_{r,i}-size_{r,j}|)$ is used to determine the absolute difference in room size.

Once the room ratio cost was determined, the result could be scaled using a weighting factor in step 904, similar to that discussed in step 902.

Another cost that can be calculated to help determine the accuracy of the hard segmentation HS$_n$, is to use the OCR result, as shown in step 905. While it was assumed in the example that the OCR result was 100% accurate, this does not reflect a real-world situation. Thus, while not explicitly shown in FIG. 3, an OCR value could also be included and iterated to find the minimum of the cost function. In practice, an OCR result also has a probabilistic value of what letters/numbers/symbols/etc. the image could contain. Using the example in FIG. 2E, an example OCR result could some something like the following: number 5 is 80% likely; letter S is 10% likely; letter R is 5% likely; pound sign (£) is 3% likely and the number 8 is 2% likely.

As before, the farther away a particular OCR value is from the predicted correct OCR value, the higher the associated cost. This cost is determined in step 906. The cost of the OCR deviation could be calculated using a similar cost function as discussed above. In step 906, the OCR cost can be weighted, similar to the weighting discussed above. In step 907, the total cost of the probabilistic segmentation, room ratio and OCR is added together to get a global room ratio cost.

Cost Function of Accessibility Segmentation

Figure 10:
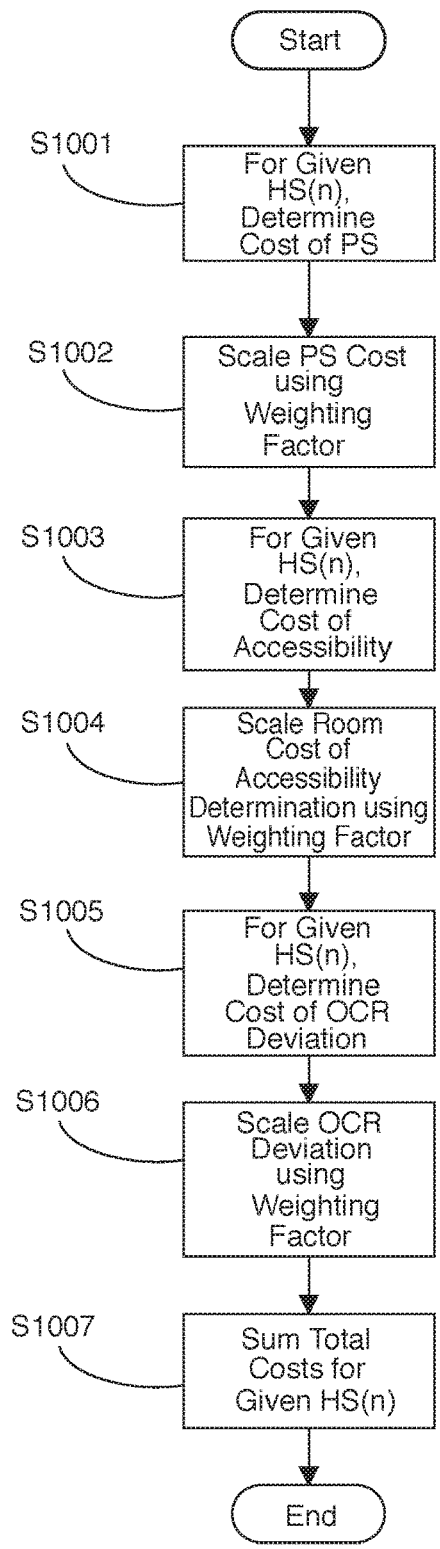
FIG. 10 is a flowchart process of determining an accessibility cost for a hard segmentation hypothesis.

FIG. 10 shows an example of an accessibility cost function for determining the cost of a hard segmentation hypothesis with respect to accessibility. For steps 1001 and 1002, please see steps 901 and 902 discussed above as the process is the same. For step 1003, an accessibility cost is determined for a given HS$_n$. As discussed previously with respect to FIG. 4, accessibility for each analyzed room will have a certain cost. If the analyzed room, room$_n$ has a minimum sized opening, as shown in FIG. 6C for example, then the accessibility cost will be low. If the analyzed room has an opening, but smaller than the minimum size, as shown in FIG. 6B, then the cost will be a medium cost. If the analyzed room doesn't have any opening, as shown in FIG. 6A, then the associated cost will be high. The cost function for determining accessibility for a given room may be as shown below:

$$\text{Room Cost}(HS_n) = \max\_j(f(w(p_{i,j}), w\_\min)$$

The above equation is for when there exists a valid path $p_{i,j}$ between the room and other rooms$_j$ (j=1, Number of Rooms); where f is a function which penalizes paths that are too narrow, e.g. $f(w, w_{min}) = \max(w_{min}-w)^q$. The exponent q can make the function non-linear. The embodiment can include using a linear or a non-linear cost curve. Having a positive q value yields an exponential cost curve. Thus, if the opening is only slightly smaller than the minimum opening width, the cost will be small, while if the opening width is much small than the minimum opening width, the cost will be exponentially higher than a linear cost curve. In other words, q can modulate the penalty term of the cost function, changing it from a linear cost to an exponential cost, for example. This cost can also be scaled, as shown in step 1004.

Next, in step 1005, a OCR cost is determined and in step 1006, the OCR cost is scaled. For steps 1005 and 1006, please see steps 905 and 906 respectively, as the procedure is the same.

The total cost of a hard segmentation (all analyzed rooms) is shown below:

$$\text{Total Room Cost}(HS_n, OCR) = \max_i(cost_i)$$

The total cost is the sum of the weighted probabilistic segmentation cost, the weighted room accessibility cost and the weighted OCR deviation cost, as shown in step 1007.

Of course, the present invention is not limited to this particular cost function and any number of known cost functions could be used.

Figure 11:
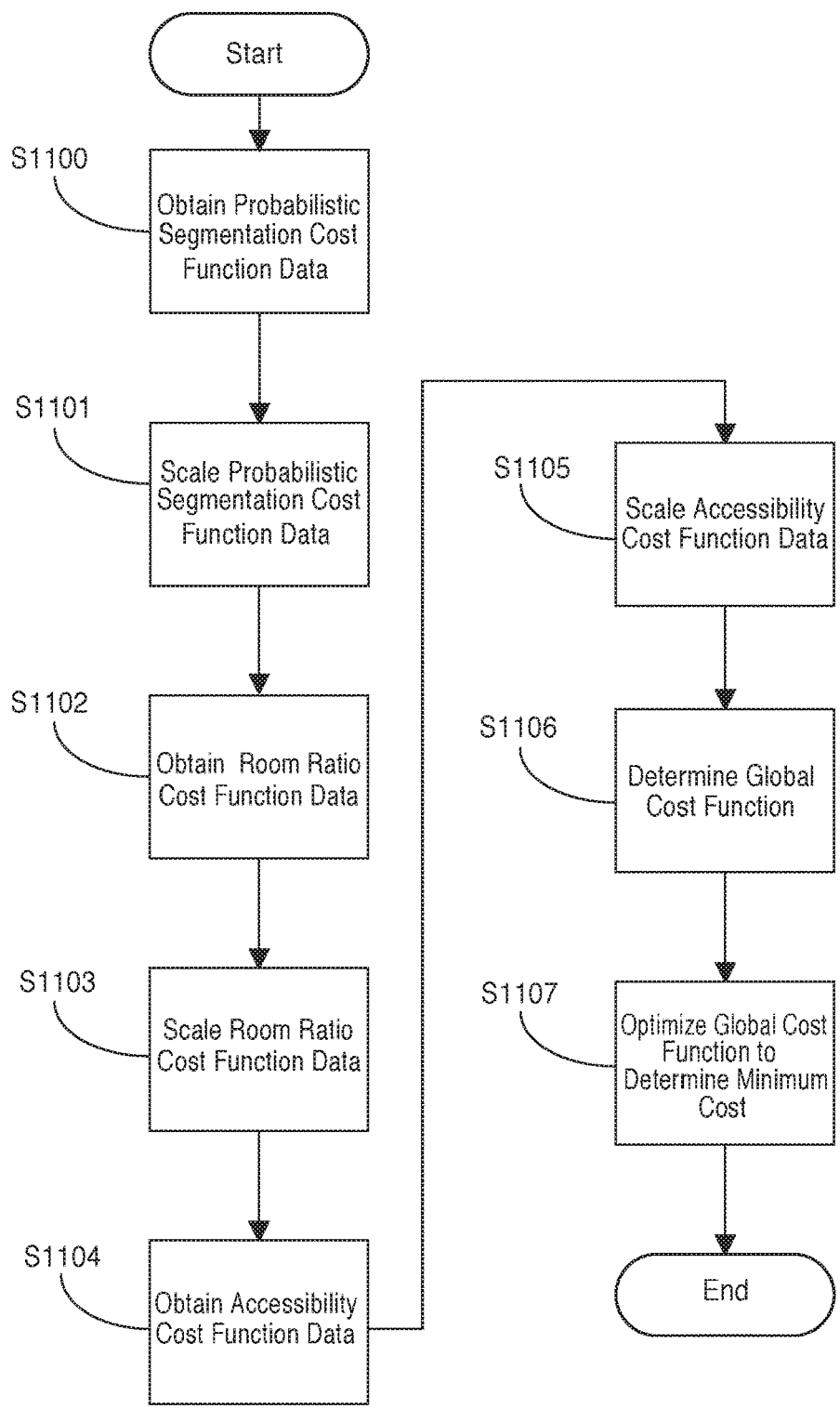
FIG. 11 is a flowchart process of determining a global cost for multiple constraints for a hard segmentation hypothesis.

Global Cost Function:

FIG. 11 is an example of calculating a global cost using the two constraints discussed above, the room size constraint and the accessibility constraint. While a single constraint can be used and the hard segmentation hypothesis can be optimized to find the lowest cost, the final hard segmentation result can be improved by using multiple constraints. For example, as shown in FIG. 11, the probabilistic segmentation data cost function data can be obtained in step 1100. Next, the room ratio cost function data and the accessibility cost function data can be obtained in steps 1101 and 1104 respectively. This data can be obtained by performing the processes in the first, second and third embodiments above. For example, in FIG. 3, step 311 seeks to determine the minimum room size cost for all hard segmentation hypotheses HS$_n$.

The room ratio cost function data and the accessibility cost function data can be scaled in steps 1103 and 1105 respectively. See the discussion regarding FIG. 9 for how to scale the data.

Once the cost function data for the probabilistic segmentation costs, room size costs and the accessibility costs are obtained and scaled if desired, a global cost function can be obtained by summing the respective costs as shown in step 1106. This global cost function is shown again below:

$$C_{global}(HS_n, OCR) = \lambda_1 * C(HS_n, PS) + \lambda_2 * C_1(HS_n, OCR) + \lambda_2 * C_2(HS_n, OCR)$$

where $C_{global}$ is the global cost, HS is the hard segmentation hypothesis, PS is the probabilistic segmentation, OCR is the optical character recognition result, $\lambda_1$ is a first scaling factor and $\lambda_2$ is a second scaling factor and $\lambda_3$ is a third scaling factor. It is noted that if a scaling factor is not desired, $\lambda$ can simply be set to 1. $C_1(HS_n, PS)$ is the cost function evaluating the likelihood of $HS_n$ given PS as an input. $C_1(HS_n, OCR)$ is a cost function penalizing violation of constraint $C_1$ (i.e. room size consistency). $C_2(HS_n, OCR)$ is a cost function penalizing violation of constraint $C_2$ (i.e. room accessibility).

Finally, to determine the minimum global cost, the global cost function can be optimized to solve for the lowest hard segmentation value as shown in step 1107, as discussed below. An optimization could be performed, for example, by iterating over many hard segmentation values and determining which hard segmentation value had the lowest cost. This global minimum cost represents the segmentation value which is most likely to be a correct semantic representation of a floorplan image.

Optimization

As has been noted above with respect to step 313 of FIG. 3, we can sample the pixels individually and then perform the iterations. We could look for iterations which maintained pixel continuity, but this should already be built in to the probability segmentation. This process can be repeated until a minimum $HS_n$ cost is found. However, iterating over every possible hard segmentation, on a pixel by pixel basis, is prohibitively computationally expensive. The embodiment disclosed herein utilizes a randomized iterative sampling of hard segmentations in an optimization process.

The embodiments of the present application achieve a large reduction in computation cost when compared to a conventional CNN system that semantically segments images. For example, the efficacy of a CNN system can be measured in several ways, including mean accuracy, intersection over union and Jaccard index. In order to achieve a comparable segmentation result without using the embodiments described above, additional run time of the CNN system would be necessary. The additional run time would of course depend on the exact structure of the CNN system as well as the training it underwent and the image it is segmenting after the training is completed. However, the inventors estimate that in order to achieve similar results to the above embodiments, an additional 5% to 20% of run time of the CNN system would be needed.

Thus, assuming the present embodiments could segment an image in 0.1.2 second, a CNN system without using the embodiments of the invention would have to take between 0.126 seconds and 0.144 seconds. The computational cost, would likewise increase by between 5% and 20%. Computational cost means any or all of the following: additional arithmetic steps by a CPU or GPU, additional memory used, additional cache used, additional power used, additional time used, among other things.

Figure 13:
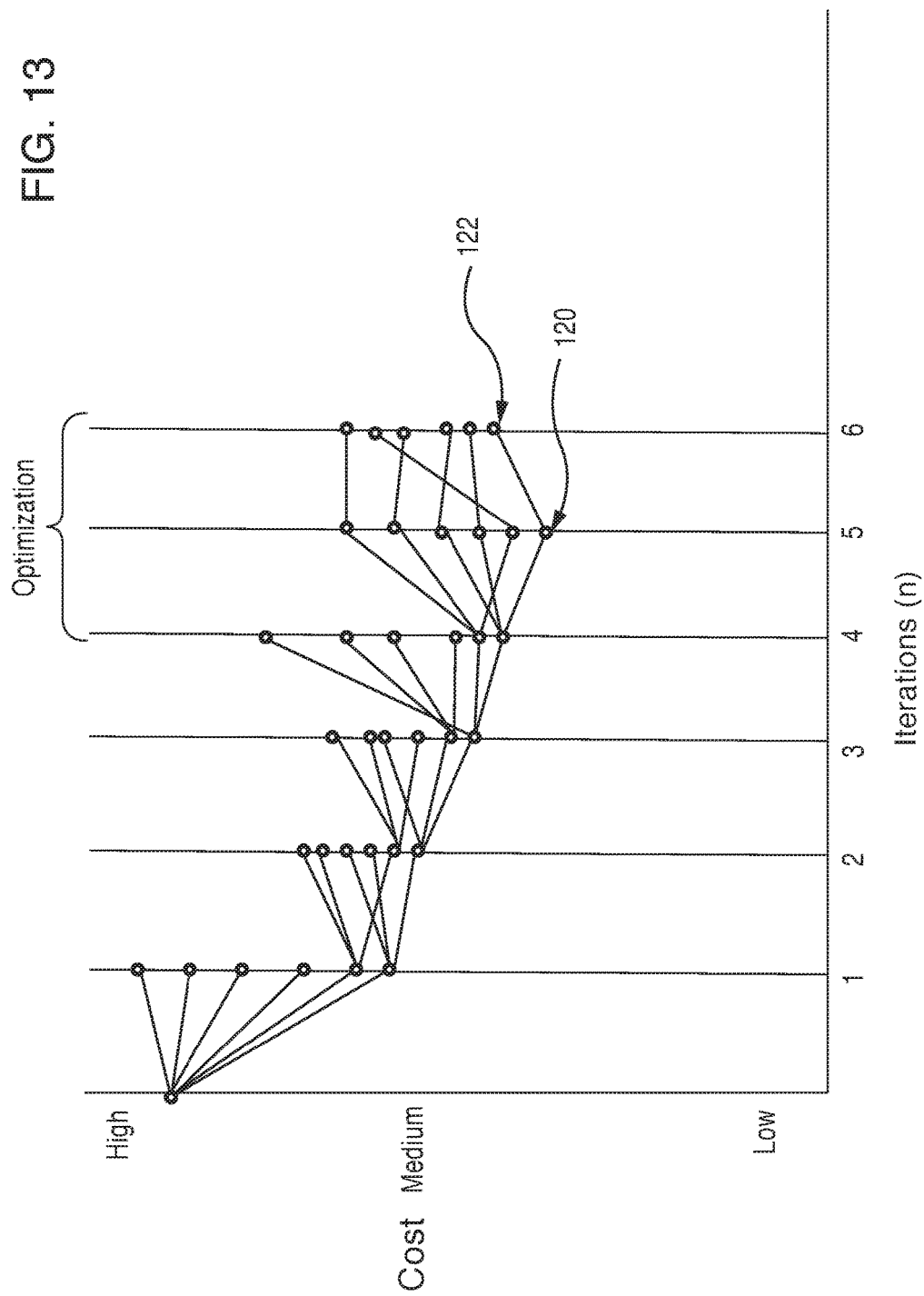
FIG. 13 shows a graph of an optimization process.

FIG. 13 is a diagramed example of an optimization of a cost function with respect to a hard segmentation ($HS_n$) cost value. The y-axis shows a relative cost ranging from low, to medium, to high. The x-axis shows the number of hard segmentation iterations. During optimization, costs are recalculated for the lowest determined cost hypothesis, over iterations, as long as lower costs are determined. FIG. 13 will be further understood when viewed in conjunction with the optimization algorithm illustrated in FIG. 12.

FIG. 12 illustrates the optimization algorithm and is a flowchart showing an example of how to optimize various constraints for the CNN system in order to determine the hard image segmentation with the lowest cost. As has been explained, this is the resultant image pixel labeling with the least likely error. Given that a processed image may have hundreds of thousands to millions of pixels, it is computationally cost prohibitive to calculate a hard segmentation with every possible probability of pixel labeling to determine the lowest cost segmentation. Thus, an approximation routine has been devised.

For example, an image is input into the CNN system in step 5010. For the input image, a probabilistic segmentation is computed in step 520 and an optical character recognition is performed in step 5030. Please see the discussion above for examples of how these steps can be performed. Next, an initial hard segmentation hypothesis is created in step 5040.

This initial hard segmentation hypothesis can be a single hypothesis, which is shown at the $0^{th}$ iteration in FIG. 13, or it could be a set of hard segmentation hypotheses (not shown for simplicity).

Next in step 5050, the hard segmentation is iterated and a plurality of hard segmentation hypothesis are created. The number of hard segmentation hypotheses could be, for example, 100, 1,000 or 10,000 or more. As shown in FIG. 13 for convenience, only 6 hard segmentation hypotheses are depicted, but typically, many more hard segmentation hypotheses would be created. In FIG. 13, the un-shown hard segmentation hypotheses would be located above the highest cost hypothesis and therefore are not relevant for explanatory purposes. The hard segmentation hypotheses can be created using the probabilistic segmentation and constraints, as discussed above, as well as the previous hard segmentation hypotheses, if available.

Next, in step 5070, the cost of each hard segmentation hypothesis is determined. As mentioned, there could be 100's or more hard segmentation hypotheses and thus all of these costs are determined. For determining the costs, the methods discuss above can be used.

In step 5080, the M hypotheses with the lowest cost are selected. In the example shown in FIG. 13, M is equal to six. Thus, the six lowest cost hard segmentation hypotheses are shown in iteration 1. This group of hard segmentation hypotheses have a minicost(t) associated with them, where t is the iteration number. The minicost(t) is the lowest cost value of all hard segmentation hypotheses at time step t.

In step 5090, the minicost(t) is compared to the minicost (t−1). That is, the system determines if the costs are increasing or decreasing with respect to the iteration number. If the cost is continuing to decrease, then the minicost(t) will be less than the minicost(t−1) and the system will go through another iteration. If the minicost(t) is greater than or equal to the minicost(t−1), then the value at (or close to) a local minimum of the cost function has been found.

If the minicost(t) is less than the minicost(t−1), as indicated above, the system will perform another iteration and return to step 5050. In the next iteration, the two hard segmentation hypotheses with the lowest cost from the previous iteration, will themselves be iterated. The number of iterated hypotheses could be more or less than two, but a small number such as two is useful for explanatory purposes.

An iteration of a hard segmentation hypothesis refers to changing a pixel label for one or more pixels and re-calculating the cost. For example, near determined room boundaries a wall pixel label may be changed to be a room pixel label while a door pixel label may be swapped with a wall pixel label. In practice, many pixels labels are changed for each iteration. The cost can be calculated using one of the methods discussed above. As before, in step 5060, 100's, 1000's or 10,000' of hard segmentation hypotheses are created, and in step 5070, these costs are calculated. In step 5080, the M hypotheses with the lowest costs are selected and a minicost is determined. This minicost is compared to the previous minicost and a determination is made as whether or not the costs are increasing or decreasing with respect to the previous cost, in step 5090.

As indicated above, if the costs are decreasing, another iteration is performed using the same steps as above. If the costs are increasing as shown by hard segmentation hypothesis 122, then a lowest cost hard segmentation hypothesis 120 is output in step 5100.

In another embodiment, a special optimization can occur where a larger number of hard segmentation hypotheses can be iterated in the final steps of determining the lowest cost. This is shown in FIG. 13 in iterations 4, 5 and 6. In this embodiment, each of the M hypotheses can be iterated in order to determine the hypothesis with the lowest cost, instead of only iterating a subset of M. This method of iterating each of the hypotheses M is usually performed after several iterations of the previous embodiment in order to reduce the computational costs.

Image Segmentation and Recognition Applications

As can be appreciated from the detailed description herein, computer vision image processing is a technological problem requiring massive amounts of computational processing to segment and extract image features. The embodiments described herein provide a technological solution by the creation of computationally efficient and accurate image segmentation and image feature recognition processes. This advance has unlimited potential applications as it advances image segmentation and recognition accuracy and computational speeds. However, a variety of applications of this technology are seen in the processing of floorplan images.

Figure 14:
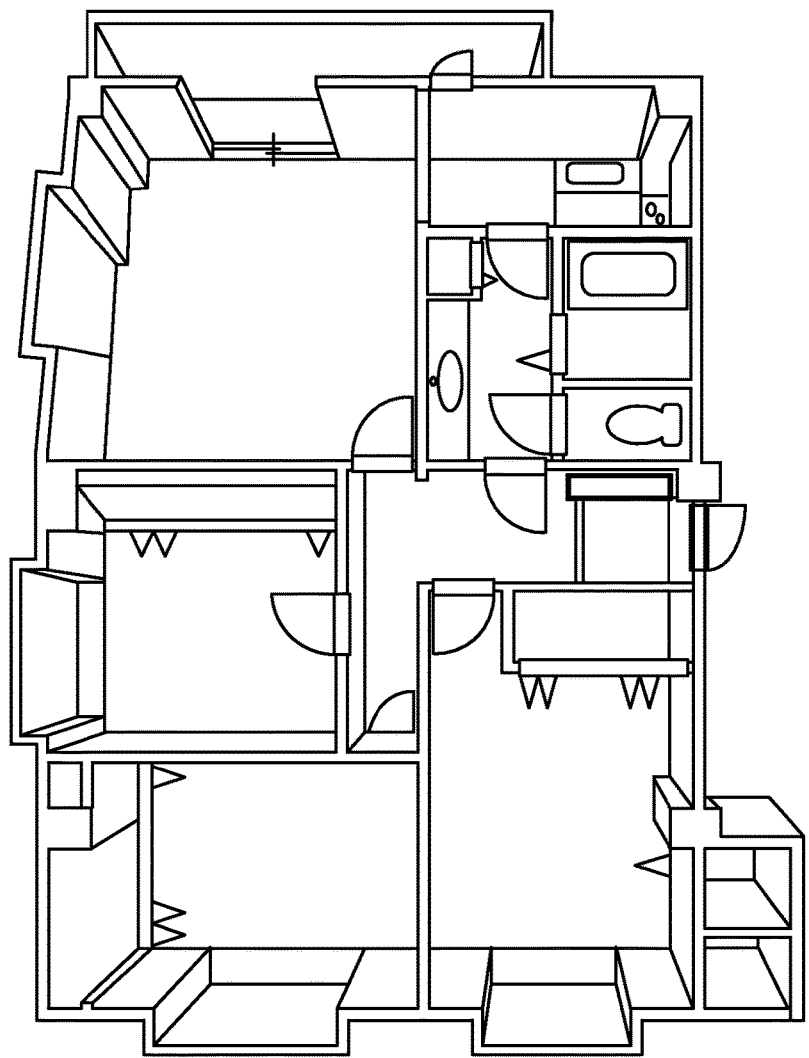
FIG. 14 shows a three-dimensional representation of a segmented floorplan image.

FIG. 14 illustrates a first application embodiment. In this embodiment, a two-dimensional floorplan image was input into the processing system. For example, the floor plan image may have been printed in real estate magazine advertising available apartments and a potential purchaser or lessee desired a visualization of the particular floorplan in three dimensions. In an application embodiment of the invention, the user may have taken a picture of the interesting floorplan with a cell phone camera or other camera device. Alternatively, the user may have scanned an image of the floorplan, or simply viewed the image in a web browser. Once the raw image data of the floorplan was obtained, it was uploaded to or forwarded to the processing system disclosed herein. By utilizing a fully trained CNN and the cost function approach for improved image segmentation and recognition technology disclosed herein, the raw image data could quickly be parsed into a hard segmentation of lowest cost (i.e. highest accuracy).

Once the wall pixels are identified, three dimensional layers of wall pixels may be added/built upon the hard segmentation image data thereby rendering a 3D visualization of the floorplan space and delivering the image back to the user. Once the 3D visualization is built, standard panning and scrolling features to provide a visual "walk-through" may be provided.

In one embodiment, processing could be maintained on backend servers, with the input image and output image delivered to the user's computer or mobile phone in a relatively short time. In another embodiment, the processing could be performed on the user's computer or mobile phone or another mobile communication device.

Figure 15:
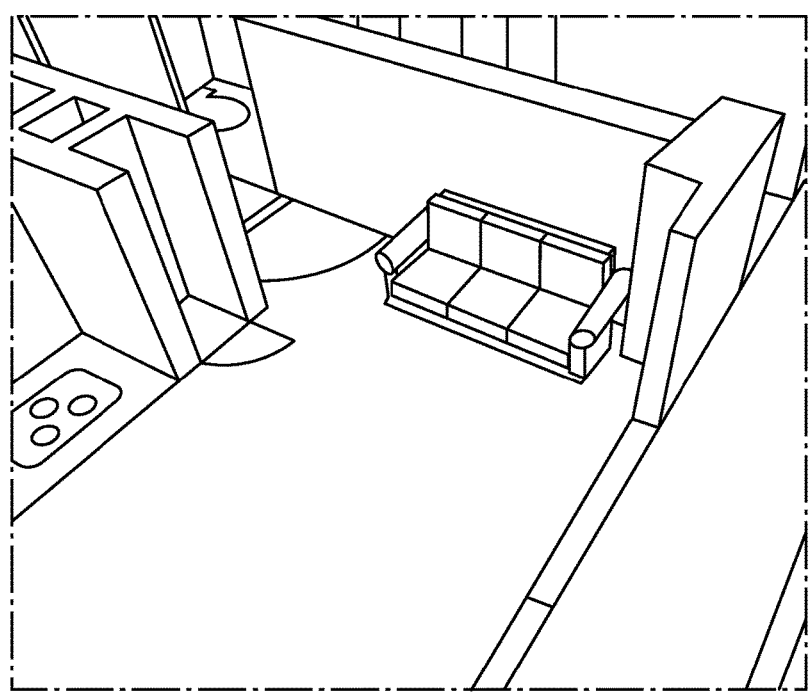
FIG. 15 shows a three-dimensional floorplan image based on a segmented floorplan image.

FIG. 15 illustrates a second application embodiment. This embodiment builds on the application described with respect to FIG. 14. Here, it is possible for the user to take pictures of or other input into the system, for example, furniture (or furniture dimensions) the user desires to see in the rendered 3D space. For example, the user would like to determine if his couch will pass through doorways and/or hallways, and see the size of the couch in relation to the determined floor plan room. The user may select from a provided gallery of furniture images an image of the furniture closes in size to his furnishing. Alternatively, image processing routines could be included in the application to process furniture images of the user's furniture in the same manner as floorplan images and determine an estimate of furniture sizes from image pixels. This data could be stored, for example, in relation to an image processing account established by the user. Once a 3D rendering of a target floorplan image of interest is generated, the user may add realistic furniture images and be able to manipulate furniture placement within the 3D processed image space.

The above examples of practical applications utilizing the technology disclosed herein are illustrative in nature and not meant to be exhaustive. Other applications will occur to one of ordinary skill in the art.

Hardware

FIG. 15 illustrates an example of a device that can run the improved segmentation device of the present invention. The improved segmentation device can be implemented on a computer, mobile device or any processing platform. The improved segmentation device can run in website browsers, mobile phone applications, large scalable networks, etc.

FIG. 15 is a diagram of example components of computing devices 1510 which may be used to implement various computer devices of the improved segmentation device adapted to analyze images described herein.

Various computing devices may be used to implement the systems and methods described in this document, as either a client or as a server or plurality of servers. Computing devices are intended to represent various forms of digital computers, such as laptops, desktops, workstations, personal digital assistants, servers, blade servers, mainframes, and other appropriate computers. Other computing devices may include various forms of mobile devices, such as personal digital assistants, cellular telephones, smartphones, and other similar computing devices. The components shown here, their connections and relationships, and their functions, are meant to be examples only, and are not meant to limit embodiments of the inventions described and/or claimed in this document.

Each of the components of the computing devices 1510 are interconnected using various busses, and may be mounted on a common board or in other manners as appropriate. The processor can process instructions for execution within the computing device, including instructions stored in the memory or on the storage device to display graphical information on a display. The output of the improved segmentation device on the computer device 1510 may be shown on a display, transmitted to another computing device, used in a three-dimensional rendering, used in another machine, etc. In other embodiments, multiple processors and/or multiple buses may be used, as appropriate, along with multiple memories and types of memory. Also, multiple computing devices may be interconnected, with each device providing portions of the necessary operations (e.g., as a server bank, a group of blade servers, or a multi-processor system).

The processor may be implemented as a chipset of chips that include separate and multiple analog and digital processors. Additionally, the processor may be implemented using any of several architectures. For example, the processor may be an x86 processor, RISC (Reduced Instruction Set Computers) processor. The processor may coordinate with the other components of the device, such as control of user interfaces, applications run by the device, and wireless communication. Multiple processors or processors with multiple cores may also be used.

The processor may communicate with a user through a control interface and display interface coupled to a display. The display may be, for example, an LED (Liquid Crystal Display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

Computer systems with a large amount of parallel processing power, such as GPU's, tend to be much faster than single processors. GPU's are discussed in more detail below.

Specifically, in image processing applications a GPU (Graphic Processing Unit) that is computationally more powerful than a CPU may be used. In practice a set of 10's, 100's or 1000's of GPUs are used to more quickly compute the vast amount of information. A GPU typically includes processors and a common memory. The processors respectively acquire data efficiently from the common memory, and perform arithmetic processing by executing a common program. An example of a GPU that can be used is a GeForce 1080 GPU.

Multiple computation units 1510A, 1510B, 1510C and 1510D are shown. The improved segmentation device is not limited to this specific configuration, but may be a single computer or many computers. Likewise, the improved segmentation device may include multiple parallel CPU's or GPU's or a combination thereof. The improved segmentation device 1500 includes a CPU 1520, memory 1550, communication unit 1530, parallel computing device 1560, and a bus 1540. The improved segmentation device 1500 may also have a display, not shown, which outputs a segmentation result, which can be in the form of an image, or a probably of each pixel's semantic determination.

Input to the improved segmentation device 1500 may be done with a personal computer, server, or other computing device 1590.

The CPU 1520 operates according to a program stored in memory 1550. The CPU 1520 controls the communication unit 1530 and the parallel computing device 1560. The program may be provided through the network 1580 such as the Internet, or provided by being stored in a computer-readable information storage medium such as a DVD-ROM or a USB memory.

The memory 1550 includes, for example, a memory device such as a RAM or a ROM and a hard disk drive. The memory 1550 stores the program. The memory also stores information or computational result input from each unit.

The communication unit 1530 can be a network card which is configured to communicate with other devices, such as a web server or other computers. The communication unit 1530 inputs information received from other devices into the CPU 1520 or the memory 1550 based on the control of the CPU 1520, and sends the information to other devices.

The bus 1540 is configured to send or receive data with the CPU 1520, memory 1550, the communication unit 1530, and the parallel computing device 1560. For example, the CPU 1520 or memory 1550 is connected to the parallel computing device 1560 through an expansion bus in the bus 1540.

The parallel computing device 1560 is hardware good at performing a large amount of the same type of the computation by parallel computation. The parallel computing device 1560 is, for example, a GPU. The parallel computing device 1560 includes parallel processors units and an in-device memory. Each parallel execution unit includes plurality of processors, an instruction unit, and a high-speed memory, for example.

Each parallel processor performs floating-point computation and reading or writing data with the in-device memory and the high-speed memory. The instruction unit causes the parallel processor, which are included in the parallel execution unit including the instruction unit, to perform processing based on a program stored in the in-device memory etc. The parallel processor included in one of the parallel execution units process the same instruction according to an instruction from the instruction unit included in such parallel execution unit. In this way, a plurality of parallel processors can be controlled by one instruction unit, thereby suppressing an increase in circuit size of the instruction unit. As such, it is possible to increase the number of the parallel processors included in the parallel computing device 1560 compared to a case of the CPU 1520.

The in-device memory can be composed of a DRAM. The in-device memory is connected to the CPU 1520 and the memory 1550 through the bus 1540. The parallel computing device 1560 also includes a circuit for transferring data between the in-device memory and memory 1550 via a DMA transfer. The high-speed memory is composed of, for example, a SRAM that is capable of higher speed access than the in-device memory. Each of the in-device memory and the high-speed memory is a common memory accessible from the parallel processors of the GPU 1560.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible. Some process steps may be executed in different order from the specific description herein based on, for example, considerations of function, purpose, conformance to standard, legacy structure, user interface design, and the like.

A number of embodiments of the invention have been described. It should be understood that various modifications may be made without departing from the spirit and scope of the invention. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

We claim:

1. A method of determining a floorplan using a specially programmed machine, the machine comprising and a processor, a memory and a display, in communication with one another, the method comprising:
    obtaining a first floorplan image into said machine;
    obtaining semantic segmentation data of the floorplan image;
    obtaining optical character recognition (OCR) data for the floorplan image;
    using the machine to compare the results of the OCR data to the semantic segmentation data with respect to a room size; and
    outputting a second floorplan image based on a result of the comparison.

2. The method according to claim 1, wherein the semantic segmentation data is obtained by using a convolutional neural network to parse the floorplan image.

3. The method according to claim 1, wherein the OCR data is a number associated with a size of a room.

4. The method according to claim 1, wherein an output of the OCR data is associated with each room according to the probabilistic segmentation data.

5. The method according to claim 4, wherein each room with associated OCR data is used to estimate other rooms in the first floorplan image.

6. The method according to claim 5, wherein the semantic segmentation data comprises a plurality of segmentation hypotheses.

7. The method according to claim 6, wherein a cost function is used to determine the cost of each segmentation hypothesis.

8. The method according to claim 7, wherein said cost function computes a relative cost for each segmentation hypothesis and outputs the segmentation hypothesis with the lowest cost.

9. The method according to claim 1, wherein the OCR data is a unit associated with a size of a room.

10. The method according to claim 8, wherein said cost function is $$\text{Cost}(HS_n, OCR) = \frac{1}{R} \sum \frac{(|\max_i(j)| * |size_{r,i} - size_{r,j}|)}{\max_k(size_{r,j})}$$

where for each room, $room_r$, $r=1 \ldots, R$ (from segmentation S), a list of hypotheses: $size_{r,1}, \ldots, size_{r,M}$, each size estimate from one OCR result, given there are M OCR results, and wherein the term $(|\max_{i,j}| * |size_{r,i} - size_{r,j}|)$ is used to normalize the room size and the term $(|\max_{i,j}| * |size_{r,i} - size_{r,j}|)$ is used to determine the absolute difference in room size.

11. A floorplan determining machine comprising and a processor, a memory and a display, in communication with one another, the machine being programmed to:
obtain a first floorplan image;
obtain semantic segmentation data of the first floorplan image;
obtain optical character recognition (OCR) data for the first floorplan image;
compare the results of the OCR data to the semantic segmentation data with respect to room accessibility; and
output a second floorplan image based on a result of the comparison.

12. The floorplan determining machine to claim 11, wherein the machine is configured to calculate a scale for a pixel in the first floorplan image.

13. The floorplan determining machine according to claim 12, wherein the machine is configured to calculate widths of paths between pairs of rooms of the first floorplan image.

14. The floorplan determining machine according to claim 13, wherein the machine is configured to determine a minimum width of a path for a room pair, as the minimum width over all room pairs.

15. The floorplan determining machine according to claim 11, wherein the OCR data is a room size.

16. The floorplan determining machine according to claim 15, wherein the scale for a pixel is calculated by dividing the room size by a number of pixels in the room.

17. The floorplan determining machine according to claim 15, wherein the pixel scale is used to calculate the minimum width.

18. The floorplan determining machine according to claim 17, wherein the second floorplan image is output based on a lowest cost of a cost function.

19. A method of determining a floorplan using a specially programmed machine, the machine comprising and a processor, a memory and a display, in communication with one another, the method comprising:
obtaining a first floorplan image into said machine;
obtaining semantic segmentation data of the first floorplan image;
obtaining optical character recognition (OCR) data for the first floorplan image;
using the machine to compare the results of the OCR data to the semantic segmentation data with respect to room accessibility;
using the machine to compare the results of the OCR data to the semantic segmentation data with respect to room size; and
outputting a second floorplan image based on a result of the comparison.

20. The method according to claim 19, wherein the second floorplan image is output based on a lowest combined cost of a room size cost and of a room accessibility cost.

* * * * *